(12) United States Patent
Cain et al.

(10) Patent No.: US 10,584,297 B2
(45) Date of Patent: Mar. 10, 2020

(54) POLYOLEFIN-DERIVED DISPERSANTS

(71) Applicant: Afton Chemical Corporation, Richmond, VA (US)

(72) Inventors: Nathaniel Cain, Richmond, VA (US); John T. Loper, Richmond, VA (US); Lawrence Cunningham, Mechanicsville, VA (US); Joseph W. Roos, Mechanicsville, VA (US)

(73) Assignee: AFTON Chemical Corporation, Richmond, VA (US)

( * ) Notice: Subject to any disclaimer, the term of this patent is extended or adjusted under 35 U.S.C. 154(b) by 0 days.

(21) Appl. No.: 15/377,788

(22) Filed: Dec. 13, 2016

(65) Prior Publication Data

US 2018/0163153 A1 Jun. 14, 2018

(51) Int. Cl.
*C10M 169/04* (2006.01)
*C10M 143/18* (2006.01)
(Continued)

(52) U.S. Cl.
CPC ............. *C10L 10/04* (2013.01); *C08F 8/00* (2013.01); *C08F 8/20* (2013.01); *C08F 8/32* (2013.01); *C08F 8/46* (2013.01); *C08F 8/48* (2013.01); *C08F 210/00* (2013.01); *C10L 1/16* (2013.01); *C10L 1/1641* (2013.01); *C10L 1/236* (2013.01); *C10L 1/238* (2013.01); *C10L 1/2364* (2013.01); *C10L 1/2383* (2013.01); *C10L 10/06* (2013.01); *C10L 10/14* (2013.01); *C10L 10/18* (2013.01); *C10M 101/00* (2013.01); *C10M 137/04* (2013.01); *C10M 137/10* (2013.01);
(Continued)

(58) Field of Classification Search
CPC ..................... C10M 166/16; C10M 133/44
USPC .................................. 508/287, 316
See application file for complete search history.

(56) References Cited

U.S. PATENT DOCUMENTS 2,098,869 A 11/1937 Jesse et al.
2,840,551 A 6/1958 Field et al.
(Continued)

FOREIGN PATENT DOCUMENTS

EP 0200351 A2 11/1986
EP 223394 A1 5/1987
(Continued)

OTHER PUBLICATIONS

International Search Report and Written Opinion; dated Mar. 7, 2018 for PCT Application No. PCT/US2017/065767.
(Continued)

*Primary Examiner* — Prem C Singh
*Assistant Examiner* — Francis C Campanell
(74) *Attorney, Agent, or Firm* — Mendelsohn Dunleavy, P.C.

(57) ABSTRACT

Ethylene-$C_3$-$C_{10}$ alpha olefin copolymers, dispersants and lubricating oils/fuel compositions incorporating dispersants, and related methods are generally described herein. The copolymer may comprise ethylene-derived units and $C_3$-$C_{10}$ alpha-olefin-derived units. The $C_3$-$C_{10}$ alpha-olefin-derived units may have a carbon number from three to ten. For example, the $C_3$-$C_{10}$ alpha-olefin-derived units may be propylene-derived units.

24 Claims, 3 Drawing Sheets

(51) Int. Cl.

| | | |
|---|---|---|
| *C10L 10/04* | (2006.01) | |
| *C10M 159/12* | (2006.01) | |
| *C10L 10/18* | (2006.01) | |
| *C10M 171/00* | (2006.01) | |
| *C08F 210/00* | (2006.01) | |
| *C10L 10/14* | (2006.01) | |
| *C08F 8/00* | (2006.01) | |
| *C08F 8/20* | (2006.01) | |
| *C10L 1/16* | (2006.01) | |
| *C08F 8/48* | (2006.01) | |
| *C10L 1/238* | (2006.01) | |
| *C10L 1/236* | (2006.01) | |
| *C08F 8/32* | (2006.01) | |
| *C08F 8/46* | (2006.01) | |
| *C10L 1/2383* | (2006.01) | |
| *C10L 10/06* | (2006.01) | |
| *F02M 65/00* | (2006.01) | |
| *C10M 101/00* | (2006.01) | |
| *C10M 137/04* | (2006.01) | |
| *C10M 137/10* | (2006.01) | |
| *C10M 137/12* | (2006.01) | |
| *C10M 149/10* | (2006.01) | |
| *C10M 161/00* | (2006.01) | |
| *C08F 4/6592* | (2006.01) | |
| *C08F 4/659* | (2006.01) | |

(52) U.S. Cl.
CPC ...... *C10M 137/105* (2013.01); *C10M 137/12* (2013.01); *C10M 149/10* (2013.01); *C10M 159/12* (2013.01); *C10M 161/00* (2013.01); *C10M 169/044* (2013.01); *C10M 171/00* (2013.01); *F02M 65/008* (2013.01); *C08F 4/65908* (2013.01); *C08F 4/65912* (2013.01); *C08F 4/65925* (2013.01); *C08F 2800/10* (2013.01); *C08F 2810/40* (2013.01); *C10L 2200/0259* (2013.01); *C10L 2250/04* (2013.01); *C10L 2270/023* (2013.01); *C10L 2270/026* (2013.01); *C10M 2203/003* (2013.01); *C10M 2203/1006* (2013.01); *C10M 2205/022* (2013.01); *C10M 2205/024* (2013.01); *C10M 2215/04* (2013.01); *C10M 2215/042* (2013.01); *C10M 2215/223* (2013.01); *C10M 2215/28* (2013.01); *C10M 2217/043* (2013.01); *C10M 2217/06* (2013.01); *C10M 2223/04* (2013.01); *C10M 2223/045* (2013.01); *C10M 2223/047* (2013.01); *C10M 2223/06* (2013.01); *C10N 2220/021* (2013.01); *C10N 2230/02* (2013.01); *C10N 2230/04* (2013.01); *C10N 2230/06* (2013.01); *C10N 2230/08* (2013.01); *C10N 2230/40* (2013.01); *C10N 2230/45* (2013.01); *C10N 2240/04* (2013.01); *C10N 2240/042* (2013.01); *C10N 2240/044* (2013.01); *C10N 2240/08* (2013.01); *C10N 2240/10* (2013.01); *C10N 2240/102* (2013.01); *C10N 2240/104* (2013.01); *C10N 2260/00* (2013.01); *C10N 2260/14* (2013.01); *C10N 2270/00* (2013.01); *C10N 2270/02* (2013.01)

(56) References Cited

U.S. PATENT DOCUMENTS

| | | |
|---|---|---|
| 3,149,178 A | 9/1964 | Hamilton et al. |
| 3,160,672 A | 12/1964 | Pearson et al. |
| 3,166,536 A | 1/1965 | Witt |
| 3,201,364 A | 8/1965 | Salyer |
| 3,215,707 A | 11/1965 | Rense |
| 3,219,666 A | 11/1965 | Norman et al. |
| 3,565,804 A | 2/1971 | Honnen et al. |
| 3,634,515 A | 1/1972 | Piasek et al. |
| 3,697,574 A | 10/1972 | Piasek et al. |
| 3,736,357 A | 5/1973 | Piasek et al. |
| 3,778,371 A | 12/1973 | Malec |
| 4,132,698 A | 1/1979 | Gessler et al. |
| 4,171,959 A | 10/1979 | Vartanian |
| 4,234,435 A | 11/1980 | Meinhardt et al. |
| 4,253,980 A | 3/1981 | Hammond et al. |
| 4,259,194 A | 3/1981 | DeVries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | DeVries et al. |
| 4,272,387 A | 6/1981 | King et al. |
| 4,283,295 A | 8/1981 | DeVries et al. |
| 4,326,973 A | 4/1982 | Hammond et al. |
| 4,338,206 A | 7/1982 | Hammond et al. |
| 4,365,105 A | 12/1982 | Morganson et al. |
| 4,436,948 A | 3/1984 | Bobsein |
| 4,507,515 A | 3/1985 | Johnston et al. |
| 4,536,537 A | 8/1985 | Klingensmith et al. |
| 4,636,322 A | 1/1987 | Nalesnik |
| 4,645,791 A | 2/1987 | Theodore et al. |
| 4,668,834 A | 5/1987 | Rim et al. |
| 4,827,064 A | 5/1989 | Wu |
| 4,827,073 A | 5/1989 | Wu |
| 4,960,820 A | 10/1990 | Hwo |
| 5,017,299 A | 5/1991 | Gutierrez et al. |
| 5,128,056 A | 7/1992 | Gutierrez et al. |
| 5,171,908 A | 12/1992 | Rudnick |
| 5,204,012 A | 4/1993 | Schaffhausen |
| 5,225,092 A | 7/1993 | Emert et al. |
| 5,229,022 A | 7/1993 | Song et al. |
| 5,241,003 A | 8/1993 | DeGonia et al. |
| 5,254,138 A | 10/1993 | Kurek |
| 5,266,223 A | 11/1993 | Song et al. |
| 5,285,851 A | 2/1994 | Pringle |
| 5,334,321 A | 8/1994 | Harrison et al. |
| 5,350,532 A | 9/1994 | Song et al. |
| 5,405,417 A | 4/1995 | Cunningham |
| 5,433,875 A | 7/1995 | Rollin et al. |
| 5,498,809 A | 3/1996 | Emert et al. |
| 5,525,128 A | 6/1996 | McAleer et al. |
| 5,554,310 A | 9/1996 | Rossi et al. |
| 5,565,128 A | 10/1996 | Gutierrez |
| 5,608,029 A | 3/1997 | Thaler et al. |
| 5,616,153 A | 4/1997 | Mike et al. |
| 5,627,259 A | 5/1997 | Thaler et al. |
| 5,629,434 A | 5/1997 | Cusumano et al. |
| 5,633,326 A | 5/1997 | Patil et al. |
| 5,643,859 A | 7/1997 | Gutierrez et al. |
| 5,650,381 A | 7/1997 | Gatto et al. |
| 5,705,577 A | 1/1998 | Rossi et al. |
| 5,792,729 A | 8/1998 | Harrison et al. |
| 5,851,965 A | 12/1998 | Harrison et al. |
| 5,853,434 A | 12/1998 | Harrison et al. |
| 5,883,057 A | 3/1999 | Roell et al. |
| 5,936,041 A | 8/1999 | Diana et al. |
| 6,017,859 A | 1/2000 | Rossi et al. |
| 6,030,930 A | 2/2000 | Emert et al. |
| 6,034,040 A | 3/2000 | Ozbalik et al. |
| 6,066,603 A | 5/2000 | Emert et al. |
| 6,100,224 A * | 8/2000 | Peiffer ............... C08F 283/008 508/235 |
| RE37,363 E | 9/2001 | Gatto et al. |
| 6,300,291 B1 | 10/2001 | Hartley et al. |
| 6,459,005 B1 | 10/2002 | Hirano et al. |
| 6,509,288 B1 | 1/2003 | Dorer et al. |
| 6,586,646 B1 | 7/2003 | Heilman et al. |
| 6,639,020 B1 | 10/2003 | Brant |
| 6,723,685 B2 | 4/2004 | Hartley et al. |
| 6,858,767 B1 | 2/2005 | DiMaio et al. |
| 6,916,882 B2 | 7/2005 | Brant |
| RE38,929 E | 1/2006 | Gatto et al. |
| 7,109,284 B2 | 9/2006 | Ishii et al. |

(56) References Cited

U.S. PATENT DOCUMENTS

| | | | |
|---|---|---|---|
| 7,129,306 | B2 | 10/2006 | DiMaio |
| RE40,595 | E | 12/2008 | Gatto et al. |
| 7,732,390 | B2 | 6/2010 | Kadkhodayan et al. |
| 7,897,696 | B2 | 3/2011 | Huang et al. |
| 8,071,835 | B2 | 12/2011 | Wu et al. |
| 8,147,569 | B2 | 4/2012 | Barton et al. |
| 8,164,277 | B2 | 4/2012 | Stevn |
| 9,441,063 | B2 | 9/2016 | Cruz et al. |
| 2002/0193647 | A1 | 12/2002 | Heilman et al. |
| 2003/0224948 | A1* | 12/2003 | Dam .............. C10M 133/00 508/192 |
| 2004/0054040 | A1 | 3/2004 | Lin et al. |
| 2004/0106723 | A1 | 6/2004 | Yang et al. |
| 2004/0168364 | A1 | 9/2004 | Macduff et al. |
| 2006/0148990 | A1 | 7/2006 | Burrowes et al. |
| 2008/0021159 | A1 | 1/2008 | Abraham et al. |
| 2008/0182768 | A1 | 7/2008 | Devlin et al. |
| 2009/0143261 | A1* | 6/2009 | Takeoka .............. C10M 107/02 508/110 |
| 2010/0197540 | A1* | 8/2010 | Shan .............. C08L 53/00 508/591 |
| 2012/0101017 | A1 | 4/2012 | Duggal |
| 2012/0117859 | A1 | 5/2012 | Skursha et al. |
| 2014/0087985 | A1* | 3/2014 | Patil .............. C10L 1/1857 508/545 |
| 2016/0257862 | A1 | 9/2016 | Yoshimoto et al. |
| 2017/0335228 | A1 | 11/2017 | Campbell et al. |

FOREIGN PATENT DOCUMENTS

| | | |
|---|---|---|
| EP | 0300689 A3 | 1/1989 |
| EP | 0315363 A2 | 5/1989 |
| EP | 0336545 A1 | 10/1989 |
| EP | 0440508 A2 | 8/1991 |
| EP | 0453088 A1 | 10/1991 |
| EP | 0612839 A1 | 8/1994 |
| EP | 0647700 B1 | 11/1999 |
| EP | 3336113 A1 | 6/2018 |
| EP | 3336163 A1 | 6/2018 |
| FR | 2669640 A1 | 5/1992 |
| JP | 56095938 A | 8/1981 |
| JP | 07292167 A | 11/1995 |
| WO | WO9533781 A1 | 12/1992 |
| WO | WO 94/06897 A1 | 3/1994 |
| WO | WO9419436 A2 | 9/1994 |
| WO | WO9844041 A1 | 10/1998 |
| WO | WO0118109 A1 | 3/2001 |
| WO | WO0218487 A1 | 3/2002 |
| WO | WO0231044 A1 | 4/2002 |
| WO | WO03020856 A1 | 3/2003 |
| WO | WO03040095 A2 | 5/2003 |
| WO | WO03040201 A1 | 5/2003 |
| WO | WO03040202 A2 | 5/2003 |
| WO | WO03040233 A2 | 5/2003 |
| WO | WO03040442 A1 | 5/2003 |
| WO | WO03048252 A1 | 6/2003 |
| WO | WO2004014997 A2 | 2/2004 |
| WO | WO2004014998 A2 | 2/2004 |
| WO | WO2007011459 A1 | 1/2007 |
| WO | WO2007011462 A1 | 1/2007 |
| WO | WO2007011973 A1 | 1/2007 |
| WO | WO2009020706 A1 | 2/2009 |

OTHER PUBLICATIONS

McMurry, Organic Chemistry, 3rd Edition, Wadsworth Inc., 1992, p. 176.

International Search Report and Written Opinion; dated Oct. 2, 2018 for PCT Application No. PCT/US2018/037094.

Communication pursuant to Article 94(3) EPC; dated Feb. 21, 2019 for EP Application No. 17 206 857.9.

Immergut, E., et al., "Principles of Plasticization," In Plasticization and Plasticizer Processes; Advances in Chemistry, American Chemical Society: Washington, DC, 1965; pp. 1-26.

Huang, Qigu, et al. "Synthesis and characterization of oligomer from 1-decene catalyzed by supported Ziegler-Natta catalyst." European polymer journal 41 (2005): 2909-2915.

Small, P. A. "Some factors affecting the solubility of polymers." Journal of Applied Chemistry 3 (1953): 71-80.

Schneier, Bernard. "An equation for calculating the solubility parameter of random copolymers." Journal of Polymer Science Part B: Polymer Letters 10 (1972): 245-251.

Fedors, R.F., "A Method for Estimating Both the Solubility Parameters and Molar Volumes of Liquids," JPL Quarterly Technical Review, vol. 3, No. 1, 45-53, 1973.

International Search Report and Written Opinion; dated Mar. 6, 2018 for PCT Application No. PCT/US2017/065773.

Forte, Giuseppe, and Sara Ronca. "Synthesis of disentangled Ultra-High Molecular Weight Polyethylene: influence of reaction medium on material properties." International Journal of Polymer Science 2017 (2017), 8 pages.

Hansen, Redford, & Øysæd. (1996). "Improvement in the determination of triad distributions in ethylene-propylene copolymers by 13C nuclear magnetic resonance." Polymer, 37(1), 19-24.

Randall, James C. "A review of high resolution liquid 13carbon nuclear magnetic resonance characterizations of ethylene-based polymers." Journal of Macromolecular Science—Reviews in Macromolecular Chemistry and Physics 29.2-3 (1989): 201-317.

European Search Report; dated Mar. 9, 2018 for EP Application No. 17206857.9.

European Search Report; dated Mar. 6, 2018 for EP Application No. 17206850.4.

Non-Final Office Action; dated Aug. 1, 2018 for U.S. Appl. No. 15/377,152.

International Search Report and Written Opinion; dated Sep. 5, 2018 for PCT Application No. PCT/US2018/037116.

Non-Final Office Action for U.S. Appl. No. 16/006,401; dated Sep. 20, 2019, (10 pages).

Non-Final Office Action for U.S. Appl. No. 15/904,324; dated Aug. 1, 2019, (10 pages).

Non-Final Office Action for U.S. Appl. No. 16/006,258; dated Sep. 25, 2019.

International Search Report and Written Opinion for PCT Application No. PCT/US2018/061178; dated Feb. 28, 2019.

communication pursuant to Article 94(3) EPC for European Patent Application No. 17206850.4; dated Mar. 8, 2019.

International Search Report and Written Opinion for PCT Application No. PCT/US2018/65096; dated Mar. 27, 2019.

* cited by examiner

POLYOLEFIN-DERIVED DISPERSANTS

BACKGROUND

Lubricating oils perform the following tasks under a variety of different operational conditions: (1) preventing wear and fatigue; (2) controlling friction; (3) maintaining clean systems; and (4) providing the proper viscosity to form oil films to protect surfaces.

To receive a particular SAE oil grade specification (e.g., SAE 5W-30), a lubricating oil is required to meet a set of benchmarks for a battery of tests related to its viscosity at different temperatures. Tests include the KV100, Cold Crank Simulator (CCS), High Temperature High Shear (HTHS). An additional test that was added more recently is the Mini Rotary Viscometer (MRV) test, defined by ASTM D4684-14.

The MRV test was developed in response to a particular set of field issues seen in Sioux Falls, N. Dak. in the mid-1990s, where a large number of engine failures occurred after a particular weather cooling cycle was experienced. Under these conditions, engines turned over as expected when users started their cars, but soon afterwards catastrophic damage occurred. It was determined that the root cause of the engine failure was from wax/gel structure forming in the sump and inability of the oil pump to overcome the high viscosity on the suction side of the pump where low shear rates are present. As a result, no lubricant was being fed to engine components which eventually led to seizure of the engines. The MRV test was thereafter developed to address the potential for this type of failure in lubricants, which were otherwise meeting industry standards at the time.

The methodology for the MRV test is provided by ASTM D4684-14, which is herein incorporated by reference in its entirety and for all purposes. This test method covers the measurement of the yield stress and viscosity of engine oils after cooling at controlled rates over a period exceeding 45 hours to a final test temperature of between −10° C. and −40° C. The precision is stated for test temperatures from −40° C. to −15° C. The viscosity measurements are made at a shear stress of 525 Pa over a shear rate of 0.4 s$^{-1}$ to 15 s$^{-1}$. The viscosity as measured at this shear stress was found to produce the best correlation between the temperature at which the viscosity reached a critical value and borderline pumping failure temperature in engines.

When an engine oil is cooled, the rate and duration of cooling can affect its yield stress and viscosity. In this laboratory test, a fresh engine oil is slowly cooled through a temperature range where wax crystallization is known to occur, followed by relatively rapid cooling to the final test temperature. These laboratory test results have predicted as failures the known engine oils that have failed in the field because of lack of oil pumpability. These documented field failing oils all consisted of oils normally tested at −25° C. These field failures are believed to be the result of the oil forming a gel structure that results in either excessive yield stress or viscosity of the engine oil, or both.

To perform the test, an engine oil sample is held at 80° C. and then cooled at a programmed cooling rate to a final test temperature and held for a specified time period. At end of this period, a series of increasing low torques are applied to the rotor shaft until rotation occurs to determine the yield stress, if any is exhibited. A higher torque is then applied to determine the apparent viscosity of the sample.

The viscosity grades of lubricating oils are determined by the Society of Automotive Engineers (SAE). Multigrade lubricating oils must fulfill two viscosity specifications, their viscosity grade consists of two numbers, e.g. 10W-40: 10W (the first number) refers to the low-temperature viscosity ("Winter Grade"), 40 (the second number) refers to the high-temperature viscosity ("Summer Grade"). Table 1 shows the specified SAE Winter Grades and the corresponding temperatures at which lubricating oils' viscosity are tested. To receive a particular grade, the lubricating oil's viscosity must be less than 60,000 cP at the listed temperature.

TABLE 1

MRV Test Viscosity <60,000 cP at test temperature for SAE Winter Grade Specified

| | SAE Winter Grade | | | | |
|---|---|---|---|---|---|
| | 0W | 5W | 10W | 15W | 20W |
| Test Temperature (° C.) | −40 | −35 | −30 | −25 | −20 |

SUMMARY

The present invention generally relates to ethylene-$C_3$-$C_{10}$ alpha olefin copolymers, copolymer-derived dispersants and lubricating oils or fuel compositions incorporating the copolymers-derived dispersants, and related methods. The subject matter of the present invention involves, in some cases, interrelated products, alternative solutions to a particular problem, and/or a plurality of different uses of one or more systems and/or articles.

In one aspect, the present invention is generally directed to a dispersant prepared by a process comprising: functionalizing a copolymer derived from ethylene and one or more $C_3$-$C_{10}$ alpha-olefins, wherein the copolymer has a number average molecular weight of less than 5,000 g/mol as measured by GPC; wherein the ethylene content of the copolymer is less than 80 mol %; wherein the copolymer has a terminal unsaturation of 70 mol % or greater and at least 70 mol % of the unsaturation is a terminal group having a terminal vinylidene or a tri-substituted isomer of the terminal vinylidene; and wherein the copolymer has an average ethylene run length $n_{c2}$, as determined by $^{13}$C NMR spectroscopy, of less than 2.6 and also satisfying the relationship shown by the expression below:

$$n_{C2} < \frac{(EEE + EEA + AEA)}{(AEA + 0.5EEA)}$$

wherein:
EEE=$(x_{C2})^3$,
EEA=$2(x_{C2})^2(1-x_{C2})$,
AEA=$x_{C2}(1-x_{C2})^2$,
$x_{C2}$ being the mole fraction of ethylene incorporated in the copolymer as measured by $^1$H-NMR spectroscopy, E representing an ethylene monomer moiety, and A representing an alpha olefin monomer moiety.

In another aspect, the present invention is generally directed to a copolymer derived from ethylene and one or more $C_3$-$C_{10}$ alpha-olefins, wherein the copolymer has a number average molecular weight of less than 5,000 g/mol as measured by GPC; wherein the ethylene content of the copolymer is less than 80 mol %; wherein at least 70% of the copolymer has an unsaturated group, at least 70% of which is a terminal group having a terminal vinylidene or a tri-substituted isomer of the terminal vinylidene; and wherein a crossover temperature of −20° C. or lower.

In yet another set of embodiments, the present invention is generally directed to a fuel composition, comprising a derivatized copolymer of the following formula:

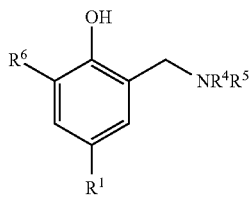

Formula (III)

wherein $R^1$ is an hydrocarbyl radical derived from the copolymer of claim 1, each of $R^4$ and $R^5$, independently, is H, $C_1$-$C_6$ alkyl, or, together with the N to which they are attached to, form a 5 or 6-membered ring optionally fused with an aromatic or non-aromatic ring; and $R^6$ is H or $C_1$-$C_6$ alkyl.

In still another embodiment, the present invention is generally directed to a method, comprising reacting ethylene and a $C_3$-$C_{10}$ alpha-olefin using a coordination polymerization catalyst to produce a copolymer comprising ethylene-derived units and $C_3$-$C_{10}$ alpha-olefin-derived units, wherein the alpha-olefin-derived units have a carbon number from three to ten; wherein the copolymer has a number average molecular weight of less than 5,000 g/mol; wherein at least 70 mol % of the copolymer terminates in a terminal vinylidene group or a tri-substituted isomer of a terminal vinylidene group; wherein the copolymer has an average ethylene-derived unit run length of less than 3, as determined through NMR spectroscopy; wherein less than 80% of a total number of units in the copolymer are ethylene-derived units; and wherein the copolymer has a crossover temperature of −20° C. or lower.

Additives described herein can be used as dispersants in lubricating oil to keep foreign insoluble particulates dispersed throughout the oil and to prevent their deposition and accumulation. Choice and design of dispersant may contribute toward an improved performance. In various embodiments, the dispersants described herein may provide one or more of the following advantages: superior dispersancy and/or viscosity, fuel economy, and/or low temperature performance. When used in a lubricating oil, the dispersants may impact passage of a MRV test as discussed herein.

In addition, the dispersants described herein may also be used in fuels, including but not limited to gasoline, biodiesel or diesel, as deposit control additives (also known as fuel detergents) to keep the fuel injectors clean or clean up fouled injectors for spark and compression type engines.

Following are sentences describing additional embodiments of the invention.

1. A dispersant prepared by a process comprising: functionalizing a copolymer derived from ethylene and one or more $C_{3-10}$ alpha-olefins, wherein the copolymer has a number average molecular weight of less than 5,000 g/mol as measured by GPC; wherein the ethylene content of the copolymer is less than 80 mol %; wherein the copolymer has a terminal unsaturation of 70 mol % or greater and at least 70 mol % of the unsaturation is a terminal group having a terminal vinylidene or a tri-substituted isomer of the terminal vinylidene; and wherein the copolymer has an average ethylene run length $n_{c2}$, as determined by $^{13}$C NMR spectroscopy, of less than 2.6 and also satisfying the relationship shown by the expression below:

$$n_{C2} < \frac{(EEE + EEA + AEA)}{(AEA + 0.5EEA)}$$

wherein:
$EEE=(x_{C2})^3$,
$EEA=2(x_{C2})^2(1-x_{C2})$,
$AEA=x_{C2}(1-x_{C2})^2$,
$x_{C2}$ being the mole fraction of ethylene incorporated in the copolymer as measured by $^1$H-NMR spectroscopy, E representing an ethylene monomer moiety, and A representing an alpha olefin monomer moiety.

2. The dispersant of sentence 1, wherein the copolymer has a crossover temperature at −25° C. or lower, or −35° C. or lower.

3. The dispersant of any preceding sentence, wherein the copolymer has a crossover temperature at −40° C. or lower.

4. The dispersant of any preceding sentence, wherein the ethylene content is less than 60 mol %.

5. The dispersant of any preceding sentence, wherein the ethylene content is less than 50 mol %.

6. The dispersant of any preceding sentence, wherein at least 10% and less than 70% of the total number of units in the copolymer are ethylene-derived units.

7. The dispersant of any preceding sentence, wherein at least 85 mol % of the unsaturation is a terminal group having a terminal vinylidene or a tri-substituted isomer of the terminal vinylidene.

8. The dispersant of any preceding sentence, wherein at least 95 mol % of the unsaturation is a terminal group having a terminal vinylidene or a hi-substituted isomer of the terminal vinylidene.

9. The dispersant of any preceding sentence, wherein the copolymer has an average ethylene run length of less than 2.4.

10. The dispersant of any preceding sentence, wherein the copolymer has an average ethylene run length of less than 2.2.

11. The dispersant of any preceding sentence, wherein the copolymer has a polydispersity index of less than or equal to 4.

12. The dispersant of any preceding sentence, wherein the copolymer has a polydispersity index of less than or equal to 3.

13. The dispersant of any preceding sentence, wherein the copolymer is an ethylene-propylene copolymer, wherein the ethylene content is 30-80 mol % and the propylene content is 20-70 mol %.

14. The dispersant of any preceding sentence, wherein the copolymer is an ethylene-propylene copolymer, wherein the ethylene content is 40-60 mol % and the propylene content is 40-60 mol %.

15. The dispersant of any preceding sentence, wherein the copolymer is an ethylene-propylene copolymer, wherein the ethylene content is about 40-50 mol % and the propylene content is about 50-60 mol %.

16. The dispersant of any preceding sentence, wherein the number average molecular weight of the copolymer is less than 3,500 g/mol.

17. The dispersant of any preceding sentence, wherein the number average molecular weight of the copolymer is less than 1,500 g/mol.

18. The dispersant of any preceding sentence, wherein the dispersant is post-treated.

19. The dispersant of any preceding sentence, wherein the dispersant is posted treated with anhydride, a boron compound, or a mixture thereof.

20. The dispersant of any preceding sentence, wherein the dispersant has one of the following formulas:

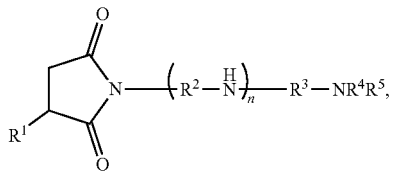

Formula (I)

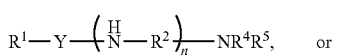

Formula (II)

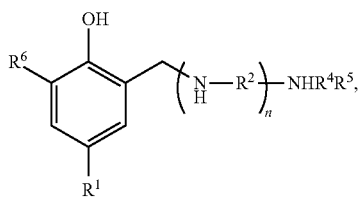

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl,

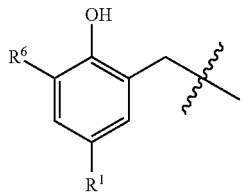

or, together with the N to which they are attached to, form a 5 or 6-membered ring optionally fused with an aromatic or non-aromatic ring; $R^6$ is H or $C_1$-$C_6$ alkyl, or —$CH_2$—(NH—$R^2$)$_n$—$NR^4R^5$; Y is a covalent bond or C(O); and n is 0, 1, 2, 3, 4, 5, 6, 7, or 8.

21. A lubricating oil, comprising: a major amount of a base oil; 3-20 wt % a viscosity index improver; 0-1 wt % a pour point depressant; and 0.2-20 wt % of the dispersant of any previous sentence.

22. The lubricating oil of sentence 21, wherein the lubricating oil has a mini-rotary viscometer (MRV) value of 60,000 cP or less at −30° C. as determined by the ASTM D4684 test.

23. The lubricating oil of any one of sentences 21 or 22, wherein the lubricating oil has a mini-rotary viscometer (MRV) value of 60,000 cP or less at −40° C. as determined by the ASTM D4684 test.

24. The lubricating oil of any one of sentences 21-23, wherein the dispersant comprises less than 10 wt % of the lubricating oil.

25. A fuel composition or fuel additive composition, comprising the dispersant of sentence 20.

26. The fuel composition or fuel additive composition of sentence 25, the dispersant having one of the following formulas:

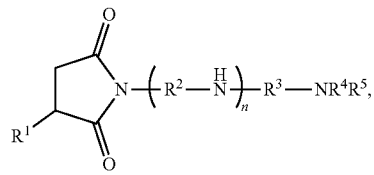

Formula (I)

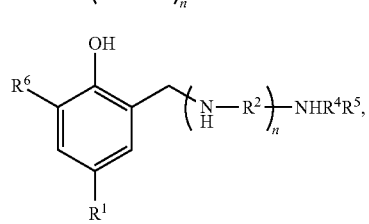

Formula (II)

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl,

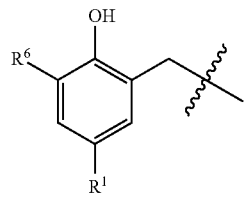

or, together with the N to which they are attached to, form a 5 or 6-membered ring optionally fused with an aromatic or non-aromatic ring; $R^6$ is H or $C_1$-$C_6$ alkyl, or —$CH_2$—(NH—$R^2$)$_n$—$NR^4R^5$; Y is a covalent bond or C(O); and n is 0, 1, 2, 3, 4, 5, 6, 7, or 8.

27. A copolymer derived from ethylene and one or more $C_{3-10}$ alpha-olefins, wherein the copolymer has a number average molecular weight of less than 5,000 g/mol as measured by GPC; wherein the ethylene content of the copolymer is less than 80 mol %; wherein at least 70% of the copolymer has an unsaturated group, at least 70% of which is a terminal group having a terminal vinylidene or a tri-substituted isomer of the terminal vinylidene; and wherein a storage modulus of the copolymer is equal to a loss modulus of the copolymer at a temperature of −30° C. or lower, the values of the storage modulus and the loss modulus of the copolymer being determined by oscillatory rheometry.

28. The copolymer of sentence 27, wherein the copolymer has an average ethylene run length ($n_{C2}$) of less than 2.6, as determined by $^{13}C$ NMR spectroscopy.

29. The copolymer of sentence 28, wherein the copolymer has an average ethylene run length ($n_{C2}$) satisfying the relationship shown by the expression below:

$$n_{C2} < \frac{(EEE + EEA + AEA)}{(AEA + 0.5EEA)}$$

wherein:
$EEE=(x_{C2})^3$,
$EEA=2(x_{C2})^2(1-x_{C2})$,
$AEA=x_{C2}(1-x_{C2})^2$,
$x_{C2}$ being the mole fraction of ethylene incorporated in the copolymer as measured by $^1$H-NMR spectroscopy, E representing an ethylene monomer moiety, and A representing an alpha olefin monomer moiety.

30. The copolymer of any one of sentences 28 or 29, wherein the copolymer has a crossover temperature of −20° C. or lower.

31. The copolymer of any one of sentences 27-30, wherein the ethylene content is less than 70 mol %.

32. The copolymer of any one of sentences 27-31, wherein less than 65% of the total number of units in the copolymer are ethylene-derived units.

33. The copolymer of any one of sentences 27-32, wherein less than 60% of the total number of units in the copolymer are ethylene-derived units.

34. The copolymer of any one of sentences 27-33, wherein less than 55% of the total number of units in the copolymer are ethylene-derived units.

35. The copolymer of any one of sentences 27-34, wherein less than 50% of the total number of units in the copolymer are ethylene-derived units.

36. The copolymer of any one of sentences 27-35, wherein less than 45% of the total number of units in the copolymer are ethylene-derived units.

37. The copolymer of any one of sentences 27-36, wherein less than 40% of the total number of units in the copolymer are ethylene-derived units.

38. The copolymer of any one of sentences 27-37, wherein at least 10% and less than 80% of the total number of units in the copolymer are ethylene-derived units.

39. The copolymer of any one of sentences 27-38, wherein at least 20% and less than 70% of the total number of units in the copolymer are ethylene-derived units.

40. The copolymer of any one of sentences 27-39, wherein at least 30% and less than 65% of the total number of units in the copolymer are ethylene-derived units.

41. The copolymer of any one of sentences 27-40, wherein at least 40% and less than 60% of the total number of units in the copolymer are ethylene-derived units.

42. The copolymer of any one of sentences 27-41, wherein at least 20% of the total number of units in the copolymer are $C_3$-$C_{10}$ alpha-olefin-derived units.

43. The copolymer of any one of sentences 27-42, wherein at least 30% of the total number of units in the copolymer are $C_3$-$C_{10}$ alpha-olefin-derived units.

44. The copolymer of any one of sentences 27-43, wherein at least 35% of the total number of units in the copolymer are $C_3$-$C_{10}$ alpha-olefin-derived units.

45. The copolymer of any one of sentences 27-44, wherein at least 40% of the total number of units in the copolymer are $C_3$-$C_{10}$ alpha-olefin-derived units.

46. The copolymer of any one of sentences 27-45, wherein at least 45% of the total number of units in the copolymer are $C_3$-$C_{10}$ alpha-olefin-derived units.

47. The copolymer of any one of sentences 27-46, wherein at least 50% of the total number of units in the copolymer are $C_3$-$C_{10}$ alpha-olefin-derived units.

48. The copolymer of any one of sentences 27-47, wherein at least 55% of the total number of units in the copolymer are $C_3$-$C_{10}$ alpha-olefin-derived units.

49. The copolymer of any one of sentences 27-48, wherein at least 60% of the total number of units in the copolymer are $C_3$-$C_{10}$ alpha-olefin-derived units.

50. The copolymer of any one of sentences 27-49, wherein at least 75 mol % of the copolymer terminates in a terminal vinylidene group or a tri-substituted isomer of a terminal vinylidene group.

51. The copolymer of any one of sentences 27-50, wherein at least 80 mol % of the copolymer terminates in a terminal vinylidene group or a tri-substituted isomer of a terminal vinylidene group.

52. The copolymer of any one of sentences 27-51, wherein at least 85 mol % of the copolymer terminates in a terminal vinylidene group or a tri-substituted isomer of a terminal vinylidene group.

53. The copolymer of any one of sentences 27-52, wherein at least 90 mol % of the copolymer terminates in a terminal vinylidene group or a tri-substituted isomer of a terminal vinylidene group.

54. The copolymer of any one of sentences 27-53, wherein at least 95 mol % of the copolymer terminates in a terminal vinylidene group or a tri-substituted isomer of a terminal vinylidene group.

55. The copolymer of any one of sentences 27-54, wherein the copolymer has an average ethylene-derived unit run length of less than 2.8.

56. The copolymer of any one of sentences 27-55, wherein the copolymer has an average ethylene-derived unit run length of less than 2.6.

57. The copolymer of any one of sentences 27-56, wherein the copolymer has an average ethylene-derived unit run length of less than 2.4.

58. The copolymer of any one of sentences 27-57, wherein the copolymer has an average ethylene-derived unit run length of less than 2.2.

59. The copolymer of any one of sentences 27-58, wherein the copolymer has an average ethylene-derived unit run length of less than 2.

60. The copolymer of any one of sentences 27-59, wherein the storage modulus of the copolymer is equal to the loss modulus of the copolymer at a temperature of −25° C. or lower.

61. The copolymer of any one of sentences 27-60, wherein the storage modulus of the copolymer is equal to the loss modulus of the copolymer at a temperature of −30° C. or lower.

62. The copolymer of any one of sentences 27-61, wherein the storage modulus of the copolymer is equal to the loss modulus of the copolymer at a temperature of −35° C. or lower.

63. The copolymer of any one of sentences 27-62, wherein the storage modulus of the copolymer is equal to the loss modulus of the copolymer at a temperature of −40° C. or lower.

64. The copolymer of any one of sentences 27-63, wherein the copolymer has a polydispersity index of less than or equal to 4.

65. The copolymer of any one of sentences 27-64, wherein the copolymer has a polydispersity index of less than or equal to 3.

66. The copolymer of any one of sentences 27-65, wherein the copolymer has a polydispersity index of less than or equal to 2.

67. The copolymer of any one of sentences 27-66, wherein the $C_3$-$C_{10}$ alpha-olefin-derived units comprise propylene-derived units.

68. The copolymer of any one of sentences 27-67, wherein the number average molecular weight of the copolymer is less than 5000 g/mol.

69. The copolymer of any one of sentences 27-68, wherein the number average molecular weight of the copolymer is less than 4000 g/mol.

70. The copolymer of any one of sentences 27-69, wherein the number average molecular weight of the copolymer is less than 3000 g/mol.

71. The copolymer of any one of sentences 27-70, wherein the number average molecular weight of the copolymer is less than 2500 g/mol.

72. The copolymer of any one of sentences 27-71, wherein the number average molecular weight of the copolymer is less than 2000 g/mol.

73. The copolymer of any one of sentences 27-72, wherein the number average molecular weight of the copolymer is less than 1500 g/mol.

74. The copolymer of any one of sentences 27-73, wherein the number average molecular weight of the copolymer is less than 1000 g/mol.

75. The copolymer of any one of sentences 27-74, wherein the number average molecular weight of the copolymer is between 800 and 3000 g/mol as measured by GPC.

76. A dispersant prepared by functionalizing a copolymer of any one of sentences 27-74.

77. The dispersant of sentence 76, wherein the dispersant has one of the following formulas:

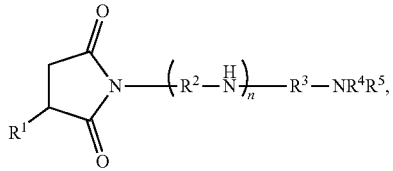
Formula (I)

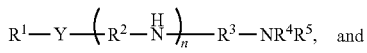
Formula (II)

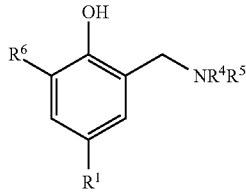
Formula (III)

wherein $R^1$ is an hydrocarbyl radical derived from the copolymer, $R^2$ is a divalent C1-C6 alkylene, $R^3$ is a divalent C1-C6 alkylene, each of $R^4$ and $R^5$, independently, is H, C1-C6 alkyl, or, together with the N to which they are attached to, form a 5 or 6-membered ring optionally fused with an aromatic or non-aromatic ring; $R^6$ is H or C1-C6 alkyl, Y is a covalent bond or C(O), and n is 0, 1, 2, 3, 4, 5, 6, 7, or 8.

78. A lubricating oil, comprising: a base oil; and 0.2-20 wt % a dispersant of any one of sentences 76 or 77.

79. The lubricating oil of sentence 78, wherein the dispersant comprises less than 15 wt % of the lubricating oil, based on a total weight of the lubricating oil.

80. The lubricating oil of any one of sentences 78 or 79, wherein the dispersant comprises less than 10 wt % of the lubricating oil, based on a total weight of the lubricating oil.

81. The lubricating oil of any one of sentences 78-80, wherein the dispersant comprises less than 5 wt % of the lubricating oil, based on a total weight of the lubricating oil.

82. The lubricating oil of any one of sentences 78-81, wherein the lubricating oil has an MRV viscosity value of 60,000 cP or less at −25° C.

83. The lubricating oil of any one of sentences 78-82, wherein the lubricating oil has an MRV viscosity value of 60,000 cP or less at −30° C.

84. The lubricating oil of any one of sentences 78-83, wherein the lubricating oil has an MRV viscosity value of 60,000 cP or less at −35° C.

85. The lubricating oil of any one of sentences 78-84, wherein the lubricating oil has an MRV viscosity value of 60,000 cP or less at −40° C.

86. A fuel or fuel additive composition, comprising a derivatized copolymer of the following formula:

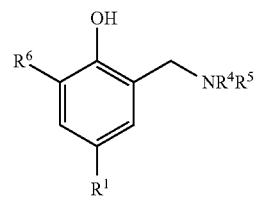
Formula (III)

wherein $R^1$ is an hydrocarbyl radical derived from the copolymer of sentence 1, each of $R^4$ and $R^5$, independently, is H, $C_1$-$C_6$ alkyl, or, together with the N to which they are attached to, form a 5 or 6-membered ring optionally fused with an aromatic or non-aromatic ring; and $R^6$ is H or $C_1$-$C_6$ alkyl.

87. The dispersant of sentence 76, wherein the dispersant is prepared by functionalizing the copolymer through one of the following chemical mechanisms: a succinimide-succinimide approach, a Koch-approach, a Mannich-approach, a hydroformylation-reductive-amination approach, or a halogenation-amination approach.

88. A dispersant prepared by a process comprising: functionalizing a copolymer derived from ethylene and one or more $C_{3-10}$ alpha-olefins, wherein the copolymer has a number average molecular weight of less than 5,000 g/mol as measured by GPC; wherein the ethylene content of the copolymer is less than 80 mol %; wherein the copolymer has a terminal unsaturation of 70 mol % or greater and at least 70 mol % of the unsaturation is a terminal group having a terminal vinylidene or a tri-substituted isomer of the terminal vinylidene; and wherein the copolymer has an average ethylene run length $n_{c2}$, as determined by $^{13}$C NMR spectroscopy, of less than 2.6 and also satisfying the relationship shown by the expression below:

$$n_{C2} < \frac{(EEE + EEA + AEA)}{(AEA + 0.5EEA)}$$

wherein:
EEE=$(x_{C2})^3$,
EEA=$2(x_{C2})^2(1-x_{C2})$,
AEA=$x_{C2}(1-x_{C2})^2$,
$x_{C2}$ being the mole fraction of ethylene incorporated in the copolymer as measured by 1H-NMR spectroscopy, E representing an ethylene monomer moiety, and A representing an alpha olefin monomer moiety.

89. The dispersant of sentence 88, wherein the copolymer has a crossover temperature of −25° C. or lower.

90. The dispersant of any one of sentences 88 or 89, wherein the copolymer has a crossover temperature of $-35°$ C. or lower.

91. The dispersant of any one of sentences 88-90, wherein the ethylene content is less than 60 mol %.

92. The dispersant of any one of sentences 88-91, wherein the ethylene content is less than 50 mol %.

93. The dispersant of any one of sentences 88-92, wherein at least 10% and less than 80% of the total number of units in the copolymer are ethylene-derived units.

94. The dispersant of any one of sentences 88-93, wherein at least 85 mol % of the unsaturation is a terminal group having a terminal vinylidene or a tri-substituted isomer of the terminal vinylidene.

95. The dispersant of any one of sentences 88-94, wherein at least 95 mol % of the unsaturation is a terminal group having a terminal vinylidene or a tri-substituted isomer of the terminal vinylidene.

96. The dispersant of any one of sentences 88-95, wherein the copolymer has an average ethylene run length of less than 2.4.

97. The dispersant of any one of sentences 88-96, wherein the copolymer has an average ethylene run length of less than 2.2.

98. The dispersant of any one of sentences 88-97, wherein the copolymer has a polydispersity index of less than or equal to 4.

99. The dispersant of any one of sentences 88-98, wherein the copolymer has a polydispersity index of less than or equal to 3.

100. The dispersant of any one of sentences 88-99, wherein the copolymer is an ethylene-propylene copolymer, wherein the ethylene content is 30-80 mol % and the propylene content is 20-70 mol %.

101. The dispersant of any one of sentences 88-100, wherein the copolymer is an ethylene-propylene copolymer, wherein the ethylene content is 40-60 mol % and the propylene content is 40-60 mol %.

102. The dispersant of any one of sentences 88-101, wherein the copolymer is an ethylene-propylene copolymer, wherein the ethylene content is about 40-50 mol % and the propylene content is about 50-60 mol %.

103. The dispersant of any one of sentences 88-102, wherein the number average molecular weight of the copolymer is less than 3,500 g/mol, as measured by GPC.

104. The dispersant of any one of sentences 88-103, wherein the number average molecular weight of the copolymer is less than 1,500 g/mol, as measured by GPC.

105. The dispersant of any one of sentences 88-104, wherein the dispersant is post-treated.

106. The dispersant of any one of sentences 88-105, wherein the dispersant is posted treated with anhydride, a boron compound, or a mixture thereof.

107. The dispersant of any one of sentences 88-106, wherein the dispersant has one of the following formulas:

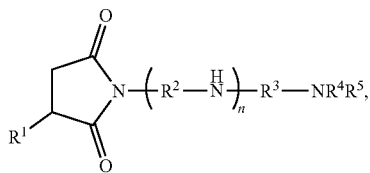

Formula (I)

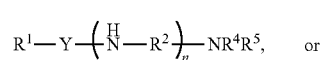

Formula (II)

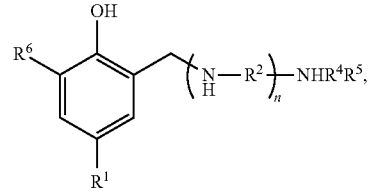

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl,

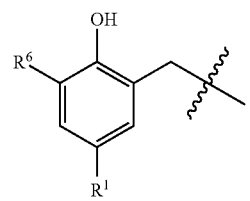

or, together with the N to which they are attached to, form a 5 or 6-membered ring optionally fused with an aromatic or non-aromatic ring; $R^6$ is H or $C_1$-$C_6$ alkyl, or —$CH_2$—(NH—$R^2)_n$—$NR^4R^5$; Y is a covalent bond or C(O); and n is 0, 1, 2, 3, 4, 5, 6, 7, or 8.

108. A lubricating oil, comprising: at least 50 wt % of a base oil; 3-20 wt % of a viscosity index improver; 0-1 wt % of a pour point depressant; and 0.2-20 wt % of the dispersant of any one of sentences 88-107.

109. The lubricating oil of sentence 108, wherein the lubricating oil has a mini-rotary viscometer (MRV) value of 60,000 cP or less at $-30°$ C. as determined by the ASTM D4684 test.

110. The lubricating oil of any one of sentences 108 or 109, wherein the lubricating oil has a mini-rotary viscometer (MRV) value of 60,000 cP or less at $-40°$ C. as determined by the ASTM D4684 test.

111. The lubricating oil of any one of sentences 108-110, wherein the dispersant comprises less than 10 wt % of the lubricating oil.

112. A lubricating additive package comprising 30-80 wt % of the dispersant of any one of sentences 88-107.

113. A fuel composition or fuel additive composition, comprising the dispersant of sentence 88-107.

114. The fuel composition or fuel additive composition of sentence 113, the dispersant having one of the following formulas:

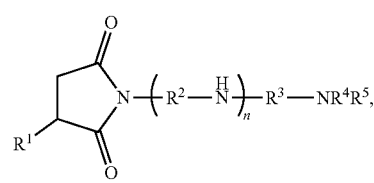

Formula (I)

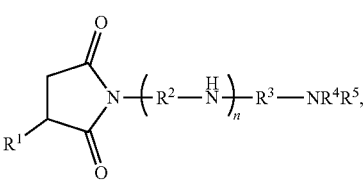

Formula (II)

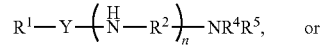

or

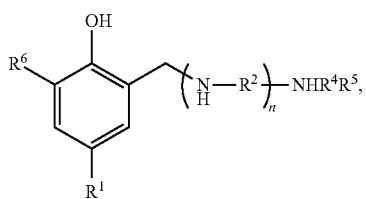

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl,

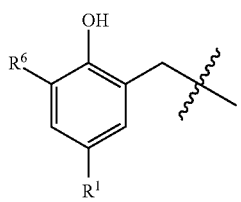

or, together with the N to which they are attached to, form a 5 or 6-membered ring optionally fused with an aromatic or non-aromatic ring; $R^6$ is H or $C_1$-$C_6$ alkyl, or —$CH_2$—(NH—$R^2$)$_n$—$NR^4R^5$; Y is a covalent bond or C(O); and n is 0, 1, 2, 3, 4, 5, 6, 7, or 8.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
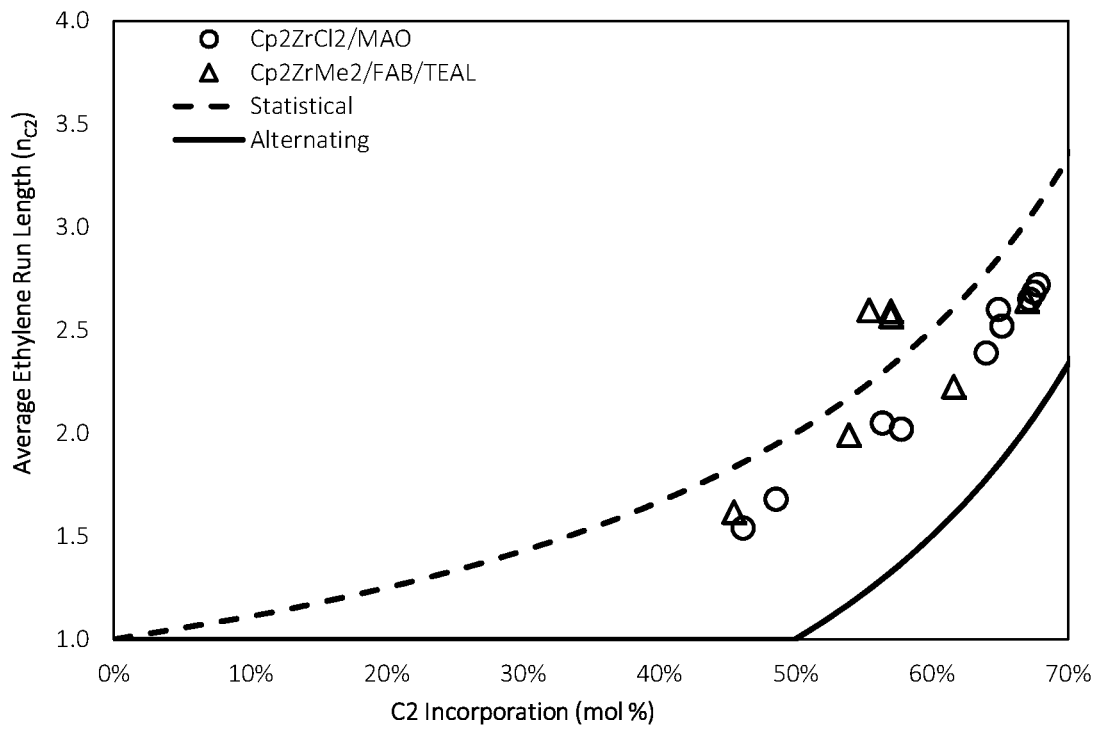
FIG. 1 is a graphical representation of the comparison of average ethylene run length to purely statistical and alternating microstructures at different ethylene incorporations for $C_2/C_3$ copolymers, according to one or more embodiments.

Ethylene-$C_3$-$C_{10}$ alpha olefin copolymers, dispersants and lubricating oils/fuel compositions incorporating dispersants (or detergents in fuels), and related methods are generally described herein. The copolymer may comprise ethylene-derived units and $C_3$-$C_{10}$ alpha-olefin-derived units. The $C_3$-$C_{10}$ alpha-olefin-derived units may have a carbon number of 3, 4, 5, 6, 7, 8, 9, or 10. For example, the $C_3$-$C_{10}$ alpha-olefin-derived units may be propylene-derived units.

An ethylene-derived unit generally refers to a —$CH_2CH_2$— unit within a copolymer chain, which is derived from an ethylene molecule during copolymerization, with a similar definition applying to $C_3$-$C_{10}$ alpha-olefin-derived unit or any other specified derived unit. The term "olefin" is given its ordinary meaning in the art, e.g., referring to a family of organic compounds which are alkenes with a chemical formula $C_xH_{2x}$, where x is the carbon number, and having a double bond within its structure. The term "alpha-olefin" is given its ordinary meaning in the art and refers to olefins having a double bond within its structure at the primary or alpha position.

According to one or more embodiments, ethylene-$C_3$-$C_{10}$ alpha olefin copolymers are generally disclosed. The copolymer may comprise ethylene-derived units and $C_3$-$C_{10}$ alpha-olefin-derived units, wherein the $C_3$-$C_{10}$ alpha-olefin has a carbon number of three to ten. Thus, the carbon number of the $C_3$-$C_{10}$ alpha-olefin may be 3, 4, 5, 6, 7, 8, 9, or 10. For example, according to some embodiments, the $C_3$-$C_{10}$ alpha-olefin-derived units are propylene-derived units. In some embodiments, the $C_3$-$C_{10}$ alpha-olefin-derived units may be 1-butylene-, 1-pentene-, 1-hexene-, 1-heptene-, 1-octene-, 1-nonene-, or 1-decene-derived units.

Crossover Temperature

One characteristic of the copolymer that helps to define its behavior in low temperatures is its crossover temperature, or onset temperature. A copolymer may generally be viscoelastic; in other words, its mechanical properties are between that of a purely elastic solid and that of a purely viscous liquid. The viscoelastic behavior of the copolymer may be characterized as the combination of an elastic portion (referred to, alternatively, as an elastic modulus or a storage modulus), and a viscous portion (referred to, alternatively, as a viscous modulus or a loss modulus). The values of these moduli are used to characterize the viscoelastic properties of the copolymer at a certain temperature. A copolymer that has a relatively higher elastic portion and a relatively lower viscous portion will behave more similarly to a purely elastic solid, while a copolymer that has a relatively lower elastic portion and a relatively higher viscous portion will behave more similarly to a purely viscous liquid. Both the storage modulus and the loss modulus are each functions of temperature, although they may change at different rates as a function of temperature. In other words, the copolymer may exhibit more elasticity or more viscosity, depending on the temperature. The highest temperature at which a value of a storage modulus of the copolymer equals a value of a loss modulus being determined by oscillatory rheometry is referred to as the crossover temperature or the onset temperature.

Oscillatory rheology is one technique that may be used to determine values (generally expressed in units of pressure) for the loss and storage moduli. The basic principle of an oscillatory rheometer is to induce a sinusoidal shear deformation in the sample (e.g., a sample of copolymer) and measure the resultant stress response. In a typical experiment, the sample is placed between two plates. While the top plate remains stationary, a motor rotates or oscillates the bottom plate, thereby imposing a time dependent strain on the sample. Simultaneously, the time dependent stress is quantified by measuring the torque that the sample imposes on the top plate.

Measuring this time dependent stress response reveals characteristics about the behavior of the material. If the material is an ideal elastic solid, then the sample stress is proportional to the strain deformation, and the proportionality constant is the shear modulus of the material. The stress is always exactly in phase with the applied sinusoidal strain deformation. In contrast, if the material is a purely viscous fluid, the stress in the sample is proportional to the rate of strain deformation, where the proportionality constant is the viscosity of the fluid. The applied strain and the measured stress are out of phase.

Viscoelastic materials show a response that contains both in-phase and out-of-phase contributions. These contributions reveal the extents of solid-like and liquid-like behavior. A viscoelastic material will show a phase shift with respect to the applied strain deformation that lies between that of solids and liquids. These can be decoupled into an elastic component (the storage modulus) and a viscosity component (the loss modulus). The viscoelastic behavior of the system thus can be characterized by the storage modulus and the loss modulus, which respectively characterize the solid-like and fluid-like contributions to the measured stress response.

As mentioned, the values of the moduli are temperature dependent. At warmer temperatures, the value of the loss modulus for the copolymer is greater than the value of the storage modulus. However, as the temperature decreases, the copolymer may behave more like an elastic solid, and the degree of contribution from the storage modulus approaches that from the loss modulus. As the temperature lowers, eventually, at a certain temperature the storage modulus crosses the loss modulus of the pure copolymer, and becomes the predominant contributor to the viscoelastic behavior of the pure copolymer. As stated above, the temperature at which the storage modulus equals the loss modulus of the pure copolymer is referred to as the crossover temperature or the onset temperature. According to one or more embodiments, a lower crossover temperature of the copolymer correlates to better low temperature performance of oils into which the copolymer is incorporated.

Thus, according to one or more embodiments, the copolymer may have a crossover temperature, that is to say, a temperature at which the storage modulus of the copolymer is equal to the loss modulus of the copolymer, of −20° C. or lower, −25° C. or lower, −30° C. or lower, −35° C. or lower, or −40° C. or lower, or −50° C. or lower, −60° C. or lower, −70° C. or lower; e.g., as determined by oscillatory rheometry. Other values are also possible. An advantageous crossover temperature for the copolymer may be achieved through controlling characteristics of the copolymer during its manufacture, as discussed herein. One such characteristic is an average ethylene-derived unit run length.

Average Run Length

According to one or more embodiments, the sequence of the ethylene-derived units and $C_3$-$C_{10}$ alpha-olefin-derived units within the copolymer may be arranged in such a way as to provide good low temperature performance. The sequential arrangement of the different units may be characterized by an average ethylene-derived unit run length.

Methods for determining ethylene sequence values are known in the art and comprise established spectroscopic procedures using $^{13}C$ nuclear magnetic resonance methods as described, for example, in "Carbon-13 NMR in Polymer Science," *ACS Symposium Series* 103, American Chemical Society, Washington, D.C. 1978 at p. 97 and in "Polymer Sequence Determination Carbon-13 NMR Method," J. C. Randall, Academic Press, New York, N.Y. at p. 53.

In a copolymer molecule comprising a chain of first and second types of subunits (e.g., ethylene-derived and propylene-derived subunits), neither of the species will be distributed uniformly along the chain of the copolymer. Instead, a certain amount of random distribution of the different types of units will take place. For example, in a representative copolymer comprising four monomers of species A and four monomers of species B, the monomers may be distributed as follows: A-A-B-A-B-B-B-A, or in any other manner. The average run length of a species is the average number of that species appearing sequentially, and may be determined for a copolymer, on the average, by dividing the total number of units of a species by the number of runs of that species. For example, in the above example, there are a total of four A units and three separate runs of A units. Therefore, the average run length of species A is 1.33. For species B, there a total of four B units and two separate runs of B units. Therefore, the average run length of species B is 2.0.

Where the arrangement of species A and B in a plurality of copolymer chains is purely random (i.e., each of A and B has a chance of appearing in a certain position proportional to the amount of that species, and regardless of whether the immediately preceding species is an A or a B unit), an expected average run length for species A can be statistically calculated as a function of the molar percentage of species A in the copolymer, as would be understood by a person of ordinary skill in the art. This value is referred to as the statistically-expected random average run-length.

According to one or more embodiments, the copolymer may be synthesized by a process through which the average run length of one of the copolymer species is less than the statistically-expected random average run length for the given molar percentage of that species, i.e., for a given position, there is a greater likelihood that a different species appears than the immediately preceding species (e.g., AB may be more favored than AA, statistically speaking). For example, taking ethylene and propylene as examples, one or more catalysts may be chosen such that during chain formation, a propylene unit is favored to bond to a preceding ethylene unit, while an ethylene unit is favored to bond to a preceding propylene unit, as discussed further below. As a result, the resulting average ethylene-derived unit run length is reduced and is less than statistically-expected random average run length for the given molar percentage of ethylene. Where the average run length is less than what would be expected from random distribution, the copolymer is between statistical and alternating. Alternatively, where the average run length is greater than would be expected from random distribution, the copolymer is between statistical and blocky.

According to one or more embodiments, an average run length for ethylene-derived units in the copolymer are, at least in part, a function of the percentage of ethylene units in the copolymer, and the chosen catalysts. For example, a higher percentage of ethylene units will naturally result in a higher average run length. The choice of catalyst affects the average run length, because the catalyst affects the relative rate of insertion of the different units.

Thus, using an ethylene-propylene copolymer as an illustrative example, during copolymer chain formation, the reaction rate at which an ethylene molecule bonds to a preceding ethylene unit at the end of the growing polymer chain is referred to as the ethylene-ethylene propagation reaction rate constant ("$k_{pEE}$"). The reaction rate at which a propylene (or other $C_3$-$C_{10}$ alpha-olefin co-monomer) bonds to an ethylene unit at the end of the growing polymer chain is referred to as the ethylene-propylene propagation reaction rate constant ("$k_{pEP}$"). The reactivity ratio of ethylene ("$r_E$") refers to the ratio of the ethylene-ethylene reaction rate constant to the ethylene-propylene propagation reaction rate constant, $k_{pEE}/k_{pEP}$.

Likewise, the reaction rate at which a propylene (or other $C_3$-$C_{10}$ alpha-olefin) molecule bonds to a propylene-derived unit at the end of the growing polymer chain is referred to as the propylene-propylene reaction rate constant ("$k_{pPP}$"). The reaction rate at which a ethylene molecule bonds to a propylene unit at the end of the growing polymer chain is referred to as the ethylene-propylene reaction rate constant ("$k_{pPE}$"). The reactivity ratio of propylene ("$r_P$") refers to the ratio of the propylene-propylene reaction rate constant to the propylene-ethylene reaction rate constant, $k_{pPP}/k_{pPE}$.

The lower each of the reactivity ratios ($r_E$ or $r_P$) are, the more likely it is that a different unit will follow the one preceding (e.g., ethylene follow propylene or vice versa) and the resulting polymer chain will have an alternating character, with a lower average ethylene-derived unit run length than would otherwise be expected from a purely random distribution of units. According to one or more embodiments, selection of an appropriate catalyst as discussed herein, as well as control of other process parameters, may reduce the reactivity ratios and therefore the average ethylene-derived unit run length, e.g., when copolymerized with propylene or other $C_3$-$C_{10}$ alpha olefins as discussed herein.

A lower average ethylene-derived unit run length may provide certain advantages. For example, it may result in a lower crossover temperature for the copolymer, thereby improving performance (e.g., cold-weather performance) of a dispersant comprising the copolymer and of the lubricating oil comprising the dispersant. In general, without wishing to be bound by any theory, it is believed that the shorter the average ethylene run length for a given ethylene content, the lower the crossover temperature of the copolymer, which ultimately results in a better low temperature performance for lubricating oils incorporating the dispersant made from the copolymer. Known techniques may be used to determine the average run length of a species in a copolymer sample, for example NMR spectroscopy.

Figure 2:
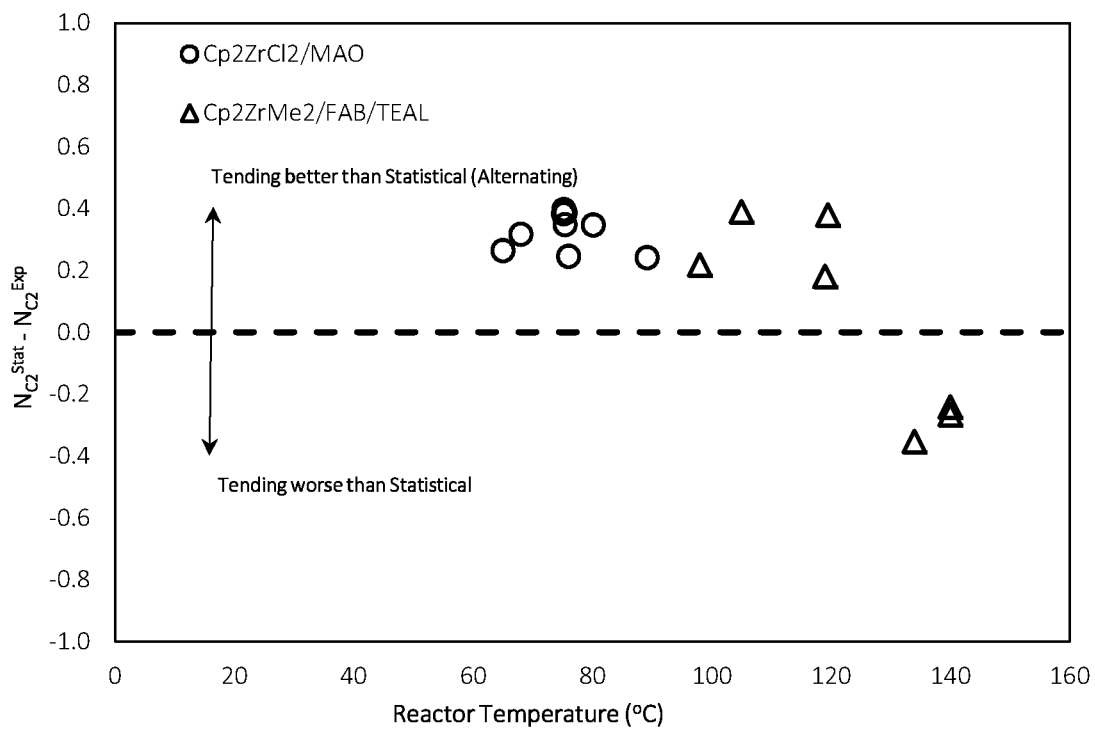
FIG. 2 is a graphical representation of the effect of reactor temperature on microstructure, according to one or more embodiments.

According to one or more embodiments, a copolymer comprising ethylene-derived units and $C_3$-$C_{10}$ alpha-olefin-derived units has an average ethylene-derived unit run length that is less than the statistically-expected random average ethylene-derived unit run length for the given molar percentage of ethylene-derived units in the copolymer. For example, as shown in FIG. 2, use of a coordination polymerization catalyst comprising the coordinated metallocene, $Cp_2ZrCl_2$, and methylaluminoxane as a co-catalyst under certain reaction conditions, results in the production of a copolymer having an average ethylene-derived unit run length that is less than the statistically expected run length for a random distribution at a given percentage of ethylene units.

According to one or more embodiments, the copolymer may have an average ethylene run length that is less than 3.0, less than 2.9, less than 2.8, less than 2.7, less than 2.6, less than 2.5, less than 2.4, less than 2.3, less than 2.1, or less than 2.0. According to one or more embodiments, a copolymer comprising ethylene and a $C_3$-$C_{10}$ alpha-olefin species has an average ethylene-derived unit run length that is less than the statistically-expected random average ethylene-derived unit run length for the given ethylene molar percentage in the copolymer.

Statistical and Alternating Microstructures

Copolymers of ethylene ($C_2$) and propylene ($C_3$) produced with perfectly alternating microstructures would not have a distribution of $C_2$ run lengths, as every ethylene sequence is exactly the same. The ethylene run length for a perfectly alternating microstructure is calculated from Equation (1).

$$n_{C2,Alternating} = \frac{x_{C2}}{(1-x_{C2})} \quad (1)$$

However, copolymers that do not have a perfectly alternating microstructure would have a distribution of $C_2$ run lengths, and the prediction of a purely statistical microstructure represents the average $C_2$ run length (also referred to as, the "average ethylene run length") for the distribution of $C_2$ run lengths. The average $C_2$ run length for copolymers produced with a purely statistical microstructure can be calculated from Bernoullian statistics, shown in Equation (2). The mole fraction of ethylene incorporated in the copolymer, $x_{C2}$, is used to calculate the fraction of EEE, EEP and PEP (there are also EPE, PPE and PPP triads) triads in a purely statistical copolymer through Equations (3)-(5).

$$n_{C2,statistical} = \frac{(EEE + EEP + PEP)}{(PEP + 0.5EEP)} \quad (2)$$

$$EEE = (x_{C2})^3 \quad (3)$$

$$EEP = 2(x_{C2})^2(1-x_{C2}) \quad (4)$$

$$PEP = x_{C2}(1-x_{C2})^2 \quad (5)$$

The experimental $C_2$ incorporation in mol % can be determined from $^1$H-NMR or $^{13}$C NMR using standard techniques known to those of ordinary skill in the art. The experimental average $C_2$ run length can be determined from $^{13}$C-NMR using standard techniques. The comparison between the experimentally determined average $C_2$ run length and the calculations for the alternating and statistical results are shown in FIG. 1 at different ethylene incorporations. A comparison of the experimental results for average $C_2$ run length to the calculated statistical and alternating results yields an indication of whether the copolymers produced have microstructures worse or better than statistical. Without being bound by any theory, it is believed that microstructures that are worse than statistical have a broader distribution of $C_2$ run lengths about the average.

Increasing the ethylene content of the copolymer increases the plasticization efficiency, plasticization durability, and oxidative stability of the plasticizer but also decreases the amount of structure forming that may occur at lower temperatures. It is unexpected that the particular combination of properties and microstructure of the copolymer of the present invention provides adequate plasticization efficiency, plasticization durability, and oxidative stability while at the same time providing a good low temperature performance.

The results shown in FIG. 1 were produced with two different catalyst systems. The ethylene incorporation was controlled during the polymerization using standard techniques known in the art. The copolymerization using the $Cp_2ZrCl_2$/MAO catalyst system was carried out at a lower temperature and within a narrower temperature range than the copolymerization using the $Cp_2ZrMe_2$/FAB/TEAL catalyst system, shown in FIG. 2.

The copolymerization reaction can be controlled to provide the desired copolymers of the invention. Parameters such as the reaction temperature, pressure, mixing, reactor heat management, feed rates of one or more of the reactants, types, ratio, and concentration of catalyst and/or co-catalyst and/or scavenger as well as the phase of the feed components can be controlled to influence the structure of the copolymer obtained from the reaction. Thus, a combination of several different reaction conditions can be controlled to produce the desired copolymer.

For example, it is important to run the copolymerization reaction with appropriate heat management. Since the copolymerization reaction is exothermic, in order to maintain a desired set point temperature in the reactor heat must be removed. This can be accomplished by, for example, two different methods often practiced in combination. Heat can be removed by cooling the feed stream to the reactor to a temperature well below the reaction set point temperature (even sometimes cryogenically) and therefore allowing the feed stream to absorb some of the heat of reaction through a temperature rise. In addition, heat can be removed from the reactor by external cooling, such as a cooling coil and/or a cooling jacket. The lower the set point temperature in the reactor, the more demand there is for heat removal. The higher the reaction temperature, the less heat needs to be removed, or alternatively or in combination, the more concentrated the copolymer can be (higher productivity) and/or the shorter the residence time can be (smaller reactor). The results characterizing the deviation of the average ethylene unit run length from a purely statistical microstructure are shown in FIG. 2 for both catalyst systems plotted versus the temperature of the reactor during the copolymerization.

As the reaction temperature was increased beyond 135° C., it appears that control of the microstructure may be lost and the copolymer typically becomes worse than statistical. As a result, the low temperature properties of the copolymer may be compromised. Without being bound by theory, the reduced control of the microstructure of copolymers produced at higher temperatures is believed to be due to a drop in the reaction kinetics of comonomer incorporation relative to ethylene incorporation. The more difficult it is for the comonomer to incorporate in the copolymer, the less regularly the comonomer breaks up the runs of ethylene units in the chain during copolymerization. Some strategies for improving the incorporation of comonomer at higher reaction temperatures include increasing the ratio of monomers of $C_3$-$C_{10}$ alpha-olefin/ethylene in the reactor, increasing the Al/Zr ratio in the catalyst or by making changes in the catalyst architecture.

Thus, in some embodiments of the invention, reaction temperatures of 60-135° C. are employed for the copolymerization reaction, or, more preferably, reaction temperatures of 62-130° C., or 65-125° C., or preferably 68-120° C. or 70-90° C., are employed for the copolymerization reaction.

Preferred Al/Zr ratio in the catalyst system may be less than 10,000:1, less than 1,000:1, less than 100:1, less than 10:1, less than 5:1, or less than 1:1. For boron containing technology, preferred Al/Zr ratio in the catalyst is less than 100:1, less than 50:1, less than 10:1, less than 5:1, less than 1:1, less than 0.1:1 and preferred B/Zr ratio is less than 10:1, less than 5:1, less than 2:1, less than 1.5:1, less than 1.2:1, or less than 1:1.

Low temperature properties of the copolymer can be correlated to the microstructure of the copolymer. Low temperature performance of the pure copolymer is measured by Oscillatory Rheometry. The point at which storage modulus is equal to the loss modulus, namely, the crossover or onset temperature, is an indication of the temperature at which the copolymer will begin to exhibit unfavorable structure forming. The crossover temperature is the point at which the structure formed in the copolymer exceeds the liquid-like character of the copolymer. This temperature has been shown to be predictive for determining the impact of the copolymer structure on low temperature performance as a polyolefin plasticizer.

Figure 3:
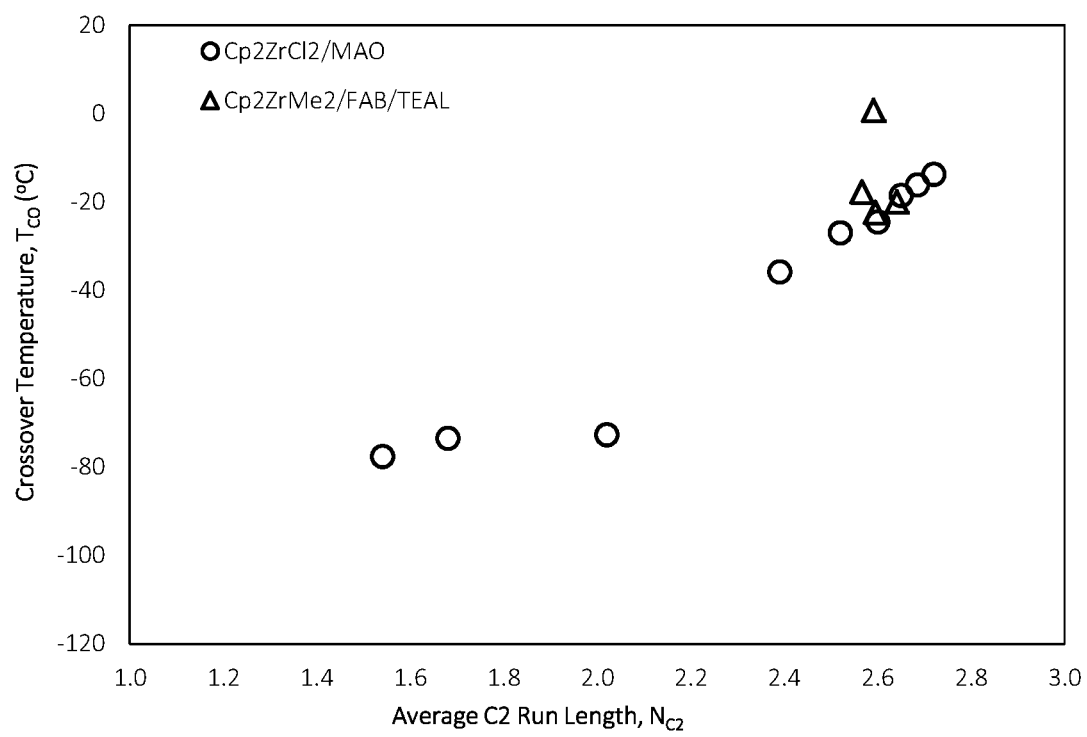
FIG. 3 is a graphical representation of the crossover temperature versus average ethylene run length for worse than statistical and better than statistical microstructures, according to one or more embodiments.
Figure 4:
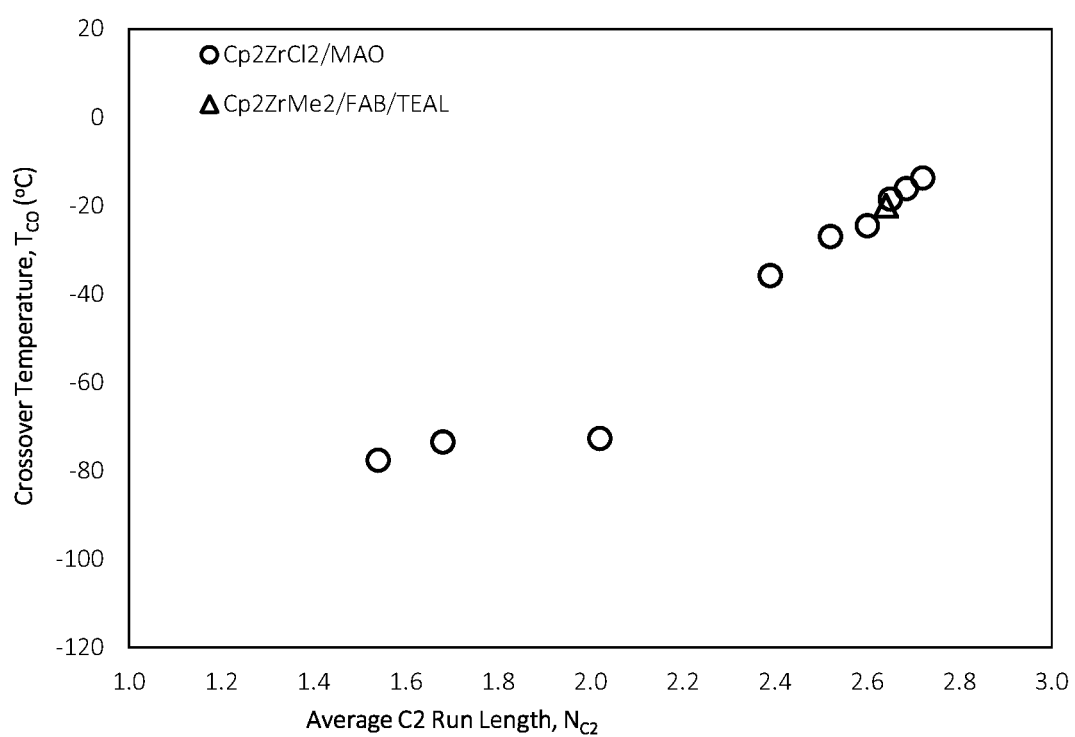
FIG. 4 is a graphical representation of the crossover temperature versus average ethylene run length for only copolymers better than statistical microstructures, according to one or more embodiments.

The impact of average ethylene unit run length on crossover temperature is shown in FIG. 3. The copolymers produced with the $Cp_2ZrCl_2$/MAO catalyst system are well-behaved and there is a strong correlation between crossover temperature and average ethylene unit run length. The copolymers produced with the $Cp_2ZrMe_2$/FAB/TEAL catalyst system can be controlled to provide the desired combination crossover temperature and average ethylene unit run length. A particularly wide range of crossover temperatures is observed for the copolymers produced using the $Cp_2ZrMe_2$/FAB/TEAL catalyst system is shown in FIG. 3. Specifically, at an approximate average $C_2$ unit run length of 2.6, the crossover temperature of these copolymers varies from almost −40° C. to about 5° C. This wide range in crossover temperature correlates with the wide variety of different microstructures that was also observed for these copolymers at the same average ethylene unit run length. In FIG. 4 only the data exhibiting better than statistical microstructures are included.

Triad Distribution

The sequential arrangement of units in the copolymer may, alternatively, be described with reference to triad distribution. The triad distribution refers to the statistical distribution of the possible combinations of three subunits in a row in a copolymer chain. Taking as an example an ethylene-propylene copolymer, where "E" represents an ethylene-derived unit and "P" represents a propylene-derived unit, potential combinations for unit triads include: E-E-E, E-E-P, P-E-P, E-P-E, P-P-E, and P-P-P. According to one or more embodiments, the amount of E-E-E is less than 20%, less than 10%, or less than 5%, an indication of a relatively short average ethylene-derived unit run length.

The method used for calculating the triad distribution of ethylene-propylene copolymers is described in J. C. Randall *JMS-Review Macromolecules Chem Physics* C29, 201 (1989) and E. W. Hansen, K. Redford *Polymer* Vol. 37, No. 1, 19-24 (1996). After collecting $^{13}C$ NMR data under quantitative conditions, eight regions (A-H), shown in Table 2 are integrated. The equations of Table 3 are applied and the values normalized. For the examples described herein, the D, E, and F regions were combined due to peak overlap, k is a normalization constant and T=total intensity.

TABLE 2

Integral Regions

| Region | Chemical Shift (ppm) |
| --- | --- |
| A | 43.5-48.0 |
| B | 36.5-39.5 |
| C | 32.5-33.5 |
| D | 29.2-31.2 |
| E | 28.5-29.3 |
| F | 26.5-27.8 |
| G | 23.5-25.5 |
| H | 19.5-22.5 |

TABLE 3

Equations $k(EEE) = 0.5(T_{DEF} + T_A + T_C + 3T_G - T_B - 2T_H)$
$K(PEE + EEP) = 0.5(T_H + 0.5T_B - T_A - 2T_G)$
$k(PEP) = T_G$
$k(EPE) = T_C$
$k(EPP + PPE) = 0.5(2T_H + T_B - 2T_A - 4T_C)$
$k(PPP) = 0.5(3T_A + 2T_C - 0.5T_B - T_H)$ Molecular Weight The number average molecular weight of the copolymer can be determined by $^1$H-NMR or gel permeation chromatography (GPC), as described in U.S. Pat. No. 5,266,223. The GPC method additionally provides molecular weight distribution information; see W. W. Yau, J. J. Kirkland and D. D. Bly, "Modern Size Exclusion Liquid Chromatography," John Wiley and Sons, New York, 1979. According to some embodiments, the copolymer may have a number average molecular weight of less than 5,000 g/mol, of less than 4,500 g/mol, of less than 4,000 g/mol, of less than 3,500 g/mol, of less than 3,000 g/mol, of less than 2,800 g/mol, of less than 2,500 g/mol, of less than 2,000 g/mol, of less than 1,500 g/mol, or of less than 1,000 g/mol as determined by GPC utilizing the polysterene standard. According to some embodiments, the copolymer may have a number average molecular weight of greater than 200 g/mol, of greater than 500 g/mol, of greater than 800 g/mol, or of greater than 1,000 g/mol, as determined by GPC. Combinations of any of the above-referenced ranges are also possible (e.g., 200-1000 g/mol, greater than 500 g/mol and less than 3,000 g/mol or greater than 500 g/mol and less than 1,500 g/mol). Other values are also possible. In addition, in some cases, NMR may be used in addition and/or instead of GPC, e.g., for determining the values described above.

The polydispersity index (PDI) of the copolymer is a measure of the variation in size of the individual chains of the copolymer. The polydispersity index is determined by dividing the weight average molecular weight of the copolymer by the number average molecular weight of the copolymer. The term number average molecular weight (determined by, e.g., $^1$H-NMR or GPC) is given its ordinary meaning in the art, and is defined as the sum of the products of the weight of each polymer chain and the number of polymer chains having that weight, divided by the total number of polymer chains. The weight average molecular weight of the copolymer is given its ordinary meaning in the art and is defined as the sum of the products of the weight squared of each polymer chain and the total number of polymer chains having that weight, divided by the sum of the products of the weight of each polymer chain and the number of polymer chains having that weight. According to one or more embodiments, the PDI of the copolymer may be less than or equal to 4, less than or equal to 3, less than or equal to 2, or less than or equal to 1.

Ethylene Content

The copolymer may comprise a certain mole percentage (mol %) of ethylene-derived units in some embodiments. According to some embodiments, the ethylene content of the copolymer, relative to the total amount of the units within the copolymer, is at least 10 mol %, at least 20 mol %, at least 30 mol %, at least 40 mol %, at least 45 mol %, at least 50 mol %, at least 55 mol %, at least 60 mol %, at least 65 mol %, at least 70 mol %, or at least 75 mol %. According to some embodiments, the ethylene content of the copolymer is less than 80 mol %, less than 75 mol %, less than 70 mol %, less than 65 mol %, less than 60 mol %, less than 55 mol %, less than 50 mol %, less than 45 mol %, less than 40 mol %, less than 30 mol %, or less than 20 mol %, Combinations of the above-referenced ranges are also possible (e.g., at least 10 mol % and less than 80 mol %, at least 20 mol % and less than 70 mol %, at least 30 mol % and less than 65 mol %, at least 40 mol % and less than 60 mol %). Other ranges are also possible, e.g., determined by $^1$H-NMR or $^{13}$C-NMR.

Comonomer Content

The copolymer may comprise a certain mole percentage of comonomer units, where the comonomer is selected from a group consisting of $C_3$-$C_{10}$ alpha-olefins having a carbon number at or between 3 and 10, e.g., propylene. According to some embodiments, the comonomer content of the copolymer, relative to the total amount of the monomers within the copolymer, is at least 20 mol %, at least 25 mol %, at least 30 mol %, at least 35 mol %, at least 40 mol %, at least 45 mol %, at least 50 mol %, at least 55 mol %, at least 60 mol %, at least 65 mol %, at least 70 mol %, or at least 80 mol %. According to some embodiments, the comonomer content of the copolymer is less than 90 mol %, less than 80 mol %, less than 70 mol %, less than 65 mol %, less than 60 mol %, less than 55 mol %, less than 50 mol %, less than 45 mol %, less than 40 mol %, less than 35 mol %, less than 30 mol %, less than 25 mol %, or less than 20 mol %, less than 90 mol %. Combinations of the above reference ranges are possible (e.g., at least 40 mol %, and less than 60 mol %). Other ranges are also possible.

Unsaturation

The copolymer may comprise polymeric chains. In some cases, at least 70% of these chains may each possess a terminal unsaturation, i.e., a carbon-carbon double bond in the terminal monomer unit of the copolymer. According to some embodiments, more than 50%, more than 55%, more than 60%, more than 65%, more than 70%, more than 75%, more than 80%, more than 85%, more than 90%, more than 95%, or more than 97%, of the copolymer molecules each possess a carbon-carbon double bond. The percentage of polymeric chains exhibiting terminal unsaturation may be determined by, e.g., FTIR spectroscopic analysis, titration, or $^{13}$C NMR. See, e.g., U.S. Pat. No. 5,128,056.

End Groups

At least some of the copolymer, in some embodiments, may terminate, at one end, with either an ethylene monomer or a $C_3$-$C_{10}$ alpha olefin monomer. The unsaturated bond can be located within the terminal group derived from the ethylene monomer or the terminal group derived from the $C_3$-$C_{10}$ alpha olefin monomer. As shown below, if the terminal group is derived from the ethylene group, it may be vinyl or disubstituted isomer of vinyl, and if the terminal group is derived from a $C_3$-$C_{10}$ alpha olefin, it may be a vinylidene or a tri-substituted isomer of the terminal vinylidene. In some embodiments, more than 50%, more than 55%, more than 60%, more than 65%, more than 70%, more than 75%, more than 80%, more than 85%, more than 90%, or more than 95% of the unsaturated bonds are located within the terminal group derived from the $C_3$-$C_{10}$ alpha olefin monomer, which has one or more of the following structural formulas (A)-(C):

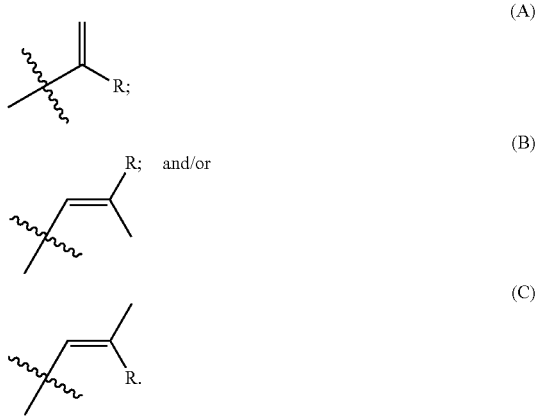

For each of Formulas (A)-(C), R represents an alkyl (e.g., methyl if the $C_3$-$C_{10}$ alpha olefin is propylene, ethyl if the $C_3$-$C_{10}$ alpha olefin is 1-butene, etc.) and

indicates the bond is attached to the remaining portion of the copolymer. In some embodiments, more than 70%, more than 75%, more than 80%, more than 85%, more than 90%, or more than 95% of the unsaturated bonds that are located within the terminal group derived from the $C_3$-$C_{10}$ alpha olefin monomer, have the terminal vinylidene formulas (A)-(C) shown above.

As used herein, the term "terminal vinylidene" refers to the structure represented by Formula (A). As used herein, the term "tri-substituted isomer of terminal vinylidene" refers to the structure represented by Formulas (B) and/or (C).

Terminal vinylidene, represented by Formula (A), tri-substituted isomers of terminal vinylidene, represented by Formulas (B) and (C), and other types of terminal unsaturated bond can be detected by $^1$H-NMR. From the integrated intensity of each signal, the amount of each unsaturated bond can be determined, e.g., as discussed in U.S. Patent Publication No. 2016/0257862.

Copolymerization

According to one or more embodiments, various methods are provided for synthesizing the copolymers described herein. One method is polymerizing ethylene and a $C_3$-$C_{10}$ alpha-olefin in the presence of a single-site coordination polymerization catalyst to produce a copolymer comprising ethylene-derived units and $C_3$-$C_{10}$ alpha-olefin-derived units.

According to one or more embodiments, the coordination polymerization catalyst may comprise a coordinated metallocene. A metallocene comprises cyclopentadienyl anions ("Cp") bound to a metal center. The coordinated metallocene may comprise a zirconium. For example, the coordinated metallocene may comprise $Cp_2ZrCl_2$. The coordination polymerization catalyst may further comprises a co-catalyst. The co-catalyst may comprise, for example, methylaluminoxane.

The copolymer may be produced in a reactor. Parameters that may be controlled during the process include pressure and temperature. The reaction may be operated continuously, semi-continuously, or batchwise. The ethylene may be delivered to a reactor through a metered feed of ethylene gas. The additional $C_3$-$C_{10}$ alpha-olefin component (e.g., propylene) of the copolymer may be delivered through a separate metered feed. The catalyst and co-catalyst may be delivered to the reactor in solution. The weight percent of either the catalyst or co-catalyst in the solution may be less than 20 wt %, less than 15 wt %, less than 10 wt %, less than 8 wt %, less than 6 wt %, less than 5 wt %, less than 4 wt %, less than 3 wt %, less than 2 wt %, or less than 1 wt %, according to different embodiments. The components may then be mixed in the reactor. Examples of different processes for forming the copolymer are described in the examples below.

In some embodiments, the microstructures are obtained by uniformally spatially distributing the composition within a reactor. Methods of ensuring composition uniformity include, but are not limited to, agitation, feed locations of monomers, solvent and catalyst components, and methods for introducing. Additional factors that may impact compositional uniformity in some cases include ensuring operating at optimal temperature and pressure space that provides a single fluid phase with the reactor based on the reactor composition and quite possibly ensuring the reactor temperature and pressure conditions are above the entire vapor-liquid phase behavior envelope of the feed composition. It is also envisioned that premixing of two or more of the feed components may be important and the premixing time and mixing intensity of the feed components is important for control of uniformity within the reactor, at least in some cases. Another subtle but important feature of certain embodiments is to ensure no pockets of vapor exist within the reactor that would create a composition gradient either at a vapor-liquid interface or within the liquid. Lower temperatures are also believed to be important for controlling the reactivity ratios in a manner that leads to microstructures with better than statistical microstructures and tending toward alternating microstructures. Some or all of the above may be important for controlling the microstructure within a polymer chain and also the comonomer composition variation from chain to chain, in various embodiments.

Copolymer Functionalization

According to one or more embodiments, the copolymer described herein may be functionalized through a variety of mechanisms to produce dispersants useful in lubricating oils or dispersants useful in fuels (also known as fuel detergents). Dispersants are typically polymeric materials with an oleophilic component providing oil solubility and a polar component providing dispersancy. Dispersants used in lubricating oils typically are hydrocarbon polymers modified to contain nitrogen- and ester-based groups. In some cases, the dispersants may include hydrocarbon polymers such as the copolymers described herein. Dispersants may be used to maintain, in a suspension in oil, any insolubles formed by oxidation, etc. during use, which may prevent sludge flocculation and precipitation. The amount of dispersant employed may be dictated and controlled, for example, by the effectiveness of the particular material in achieving its dispersant function Thus, in some cases, a dispersant can be formed by reaction of a copolymer having an end group as discussed herein with a suitable functional moiety.

According to one or more embodiments, dispersants disclosed herein may reduce the total amount of dispersant needed in a lubricating oil formulation necessary to meet certain industry standard performance criteria. According to one or more embodiments, lubricating oils that comprise the dispersants are disclosed herein. Lubricating oils comprising the dispersants disclosed herein may exhibit improved cold weather performance, as evidenced, for example, by meeting standards associated with the MRV test. Methods for making and using the copolymers, dispersants, and lubricating oils are also generally described.

According to one or more embodiments, an ethylene-$C_3$-$C_{10}$ alpha olefin copolymer may serve as the hydrocarbon tail or backbone for a dispersant incorporated into a lubricating oil showing good low temperature performance, as demonstrated by, for example, passing the MRV test for engine oil lubricants. Dispersants are typically polymeric materials with an oleophilic component providing oil solubility and a polar component providing dispersancy. Thus, for example, when used in a lubricating oil, a dispersant may facilitate passage of a MRV test. The lubricating oil's viscosity may be less than 60,000 cP at one or more temperatures as outlined in the MRV test, e.g., temperatures of less than −20° C., less than −25° C., less than −30° C., less than −35° C., less than −40° C., less than −45° C., less than −50° C., less than −55° C., less than −60° C., less than −65° C., etc.

In some embodiments, the ethylene-$C_3$-$C_{10}$ alpha copolymer useful for making dispersants has a number average molecular weight as measured by GPC less than 5000, less than 3500, or less than 2500; an ethylene content less than 80 mol %, less than 70 mol %, or 30-60 mol %; a terminal unsaturation of 70 mol % or greater, 85 mol % or greater, or 95 mol % or greater; at least 70 mol %, at least 80 mol %, or at least 90 mol % of the unsaturation is a terminal group having a terminal vinylidene or a tri-substituted isomer of the terminal vinylidene; an average ethylene run length $n_{c2}$, as determined by $^{13}C$ NMR spectroscopy, of less than 2.6, less than 2.5, or less than 2.4; and a cross over temperature less than −20° C., less than −30° C., or less than −40° C. Some copolymers may have, in various embodiments, one, two, three, four, or more of any of the above recitations. In some further embodiments, the above-described copolymer is used to prepare dispersants through one of the following chemical mechanisms, e.g., a succinimide-succinimide approach, a Koch-approach, a Mannich-approach, a hydroformylation-reductive-amination approach, or a halogenation-amination approach.

The dispersants described herein, such as hydrocarbyl amines, amides, carboxylic acids and functionalized glycols, imidazolines, succinimides, succinamides, triazines, succinic ester/acid or ester/amide, Mannich product, alkyl sulphonic acids, esters, hydrocarbyl hydroxy benzoates, betaines, and quaternary ammonium salts, etc., can be prepared, for example, by functionalizing the copolymer described above through a variety of well-known chemical mechanisms to incorporate one or more functional portion into the copolymer via the terminal double bond (see, e.g., the discussion of Formulas (A)-(C) above). Accordingly, the copolymers described herein can be used to produce suitable dispersants by functionalizing the terminal double bond portions of the copolymers to form functionalized copolymer molecules, more than 70%, more than 75%, more than 80%, more than 85%, more than 90%, or more than 95% of which are derived from functionalizing the terminal double bond of Formulas (A), (B), and/or (C). For example, the functionalized portion may be produced by any chemical derivatization of atoms or chemical moiety of the copolymer discuss herein, for example, carbon-carbon bond groups (e.g., alkenyl, alkynyl), carbon-nitrogen bond groups, carbon-oxygen bond groups, carbon-sulfur bond groups, and the like. Examples of chemical derivatization include, for example, imidization, succinimide formation (succinimide approach), a Koch reaction (Koch-approach), a Mannich reaction (Mannich-approach), a hydroformylation-reductive-amination approach, or a halogenation-amination approach, e.g., as described below. Methods of functionalizing copolymers as taught, for example, in U.S. Pat. No. 5,936,041.

Succinimide-functionalization refers to a process wherein the copolymer described herein is converted to a hydrocarbyl succinic acid or anhydride, i.e., the copolymer backbone substituted with one or more succinic acid or anhydride groups, which subsequently is reacted with a polyamine to form a hydrocarbyl succinimide. Hydrocarbyl succinic acid or anhydride can be made by derivatizing the terminal double bond with an unsaturated organic acid reagent via thermal ene reaction and/or halogenation-condensation. See, e.g., U.S. Pat. No. 7,897,696. In the hydrocarbyl succinic acid or anhydride, the ratio of succinic moiety:copolymer backbone is 0.8:1 to 2:1, preferably 1:1 to 1.6:1, more preferably 1.2:1-1.5:1.

The unsaturated organic acidic reagent of the disclosed process refers to an unsaturated substituted or un-substituted carboxylic acid reagent, for example maleic or fumaric reactants of the general formula:

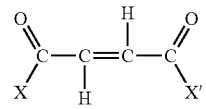

wherein X and X' are the same or different, provided that at least one of X and X' is a group that is capable of reacting to esterify alcohols, forming amides or amine salts with ammonia or amines, forming metal salts with reactive metals or basically reacting metal compounds, or otherwise functioning as an acylating agent. Typically, X and/or X' is —OH, —O-hydrocarbyl, —$NH_2$, and taken together X and X' can be —O— so as to form an anhydride. In some cases, X and X' are such that both carboxylic functions can enter into acylation reactions.

Maleic anhydride is a suitable unsaturated acidic reactant. Other suitable unsaturated acidic reactants include electron-deficient olefins such as monophenyl maleic anhydride; monomethyl maleic anhydride, dimethyl maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile and fumaronitrile.

The percent actives of the hydrocarbyl succinic anhydride can be determined using a chromatographic technique. This method is described in column 5 and 6 in U.S. Pat. No. 5,334,321.

Conversion of hydrocarbyl succinic acid or anhydride to a succinimide is well known in the art and may be accomplished through the reaction of a polyamine with the hydrocarbyl succinic acid or anhydride, wherein the polyamine has at least one basic nitrogen in the compound, as described in U.S. Pat. Nos. 3,215,707 and 4,234,435. Suitable polyamines may have at least three nitrogen atoms and about 4 to 20 carbon atoms. One or more oxygen atoms may also be present in the polyamine.

A particularly suitable group of polyamines for use in the present disclosure are polyalkylene polyamines, including alkylene diamines. Such polyalkylene polyamines may contain from about 2 to about 12 nitrogen atoms and from about 2 to about 24 carbon atoms. Preferably, the alkylene groups of such polyalkylene polyamines may contain from about 2 to about 6 carbon atoms, more preferably from about 2 to about 4 carbon atoms.

Particularly suitable polyalkylene polyamines are those having the formula: $H_2N—(R_1NH)_a—H$ wherein $R_1$ is a straight- or branched-chain alkylene group having from about about 6 carbon atoms, preferably about 2 to about 4 carbon atoms, most preferably about carbon atoms, i.e., ethylene ($—CH_2CH_2—$); and a is an integer from 1 to about 10, preferably 1 to about 4, and more preferably about 3.

Examples of suitable polyalkylene polyamines include, but are not limited to, ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly suitable polyalkylene polyamines are ethylenediamine, diethylenetriamine, triethylenetetraamine, tetraethylenepentamine, and pentaethylenehexamine.

Many of the polyamines suitable for use in the present disclosure are commercially available and others may be prepared by methods which are well known in the art. For example, methods for preparing amines and their reactions are detailed in Sidgewick's "The Organic Chemistry of Nitrogen," Clarendon Press, Oxford, 1966; Noller's "Chemistry of Organic Compounds," Saunders, Philadelphia, 2nd Ed., 1957; and Kirk-Othmer's "Encyclopedia of Chemical Technology," 2nd Ed., especially Volume 2, pp. 99-116.

The reaction of polyamine and hydrocarbyl succinic acid or anhydride affords mono-succinimide, bis-succinimide, tris-succinimide, or other succinimides depending on the charge ratio of polyamine and succinic acid or anhydride. In some embodiment, the ratio between hydrocarbyl succinic acid/anhydride and polyamine is 1:1 to 3.2:1, or 2.5:1 to 3:1, or 2.9:1 to 3:1, or 1.6:1 to 2.5:1, or 1.6:1 to 2:1, or 1.6:1 to 1.8:1, 1.3:1 to 1.6:1, 1.4:1 to 1.6:1, or 1; 1 to 1.3:1, or 1.2:1 to 1.3:1.

In some embodiments, a derivatized copolymer is prepared by a process comprising: (1) coupling an ethylene-$C_3$-$C_{10}$ alpha olefin copolymer described herein with an unsaturated mono- or dicarboxylic acid or anhydride to form a copolymer substituted with mono- or dicarboxylic acid or anhydride; (2) reacting the copolymer substituted with mono- or dicarboxylic acid or anhydride with a primary amine-containing compound; and (3) optionally post-treating the reaction product of step (2).

The Koch reaction is an organic reaction for the synthesis of tertiary carboxylic acids from alcohols or alkenes. The reaction is a strongly acid-catalyzed carbonylation using carbon monoxide, and typically occurs at high pressures ranging from 50 to 5,000 kPa, often requiring temperatures several hundred degrees higher than room temperature. Generally the reaction is conducted with strong mineral acids such as sulfuric acid, HF or $BF_3$. Koch reactions are known in the art and comprise contacting a copolymer composition having at least one carbon-carbon double bond, for example, at the terminal group, with an acid catalyst and carbon monoxide in the presence of water or alcohol. The catalyst may be a classical Brønsted acid or Lewis acid catalyst. The Koch reaction is conducted in a manner and under conditions sufficient to form a carbenium ion at the site of the carbon-carbon double bond. The carbenium ion is reacted with carbon monoxide to form an acylium cation, which in turn is reacted with at least one nucleophilic trapping agent selected from the group consisting of water or at least one hydroxyl or one thiol group containing compound. The copolymer reacts to form acylium cations which form functional groups, e.g. carbonyl functional groups.

Koch-functionalization refers to a process whereby a copolymer functionalized with at least one carboxylic acid, carboxylic ester or thiol ester functional group results. The functionalized copolymer is functionalized at the point of olefin unsaturation via a Koch reaction to form the carboxylic acid, carboxylic ester or thiol ester. Processes for Koch-functionalization of a polymer are known in the art, as described in, for example, U.S. Pat. No. 5,629,434, entitled, "Functionalization of Polymers Based on Koch Chemistry and Derivatives Thereof," incorporated herein by reference in its entirety and for all purposes.

In some embodiments, a derivatized copolymer is prepared by a process comprising (1) reacting an ethylene-$C_3$-$C_{10}$ alpha olefin copolymer described herein with CO under the Koch reaction condition, and (2) coupling the reaction product of step (1) with an amine compound.

The Mannich reaction is an organic reaction involving amino alkylation of a carbon atom adjacent to a carbonyl functional group or a carbon atom that is part of an activated phenyl group (e.g., a hydroxyl aromatic compound) in a molecule. It is commonly used to make alkylphenol-derived dispersant (also called Mannich dispersants). In some embodiments of this invention, the copolymer described herein is reacted with phenol by electrophilic addition via its terminal double bond and the resulting alkylphenol, i.e., copolymer-substituted phenol, is then reacted with formaldehyde and amine through Mannich reaction to provide 2-aminomethyl-4-alkylphenol. Processes for Mannich-functionalization of a polymer backbone are known in the art, as described in, for example, U.S. Pat. Nos. 2,098,869 and 5,608,029, both of which are incorporated herein by reference in its entirety and for all purposes.

In some embodiments, a derivatized copolymer is prepared by a process comprising: reacting an alkylphenol, an aldehyde, and an amine compound, wherein the alkylphenol is prepared from a substituted or unsubstituted hydroxyaromatic compound and an ethylene-$C_3$-$C_{10}$ alpha olefin copolymer described herein.

The hydroformylation-reductive-amination reaction involves reacting an aldehyde or ketone with an amino compound under condensation conditions sufficient to give an imine intermediate, which is subsequently reacted under hydrogenation conditions sufficient to give an amine dispersant. In some embodiments of this invention, the copolymer having terminal double bond described herein is converted to an aldehyde or ketone by hydroformylation of the terminal double bond. The resulting aldehyde or ketone may be reacted with amine under reductive amination reaction condition to provide a dispersant. Processes for hydroformylation and reductive amination reaction are known in the art, as described in, for example, U.S. Patent Application Publication 20140087985, which is incorporated herein by reference in its entirety and for all purposes.

In some embodiments, a derivatized copolymer is prepared by a process comprising: (1) hydroformylating an ethylene-$C_3$-$C_{10}$ alpha olefin copolymer described above to form a copolymer having a terminal aldehyde moiety; and (2) reacting the copolymer prepared by step (1) with an amine compound under reductive condition.

The halogenation-amination reaction involves first halogenation of the terminal double bond of the copolymer, and then reacting the halogen substituted copolymer with amine to provide an amine dispersant. See, e.g., U.S. Pat. No. 5,225,092.

In some embodiments, a derivatized copolymer is prepared by a process comprising: (1) reacting an ethylene-$C_3$-$C_{10}$ alpha olefin copolymer described herein with a halogenating agent for form a halogen-containing copolymer; and (2) coupling the halogen-containing copolymer of step (1) with an amine compound.

Amine or amino compounds useful for the Koch reaction, Mannich reaction, hydroformylation-reductive-amination reaction, and halogenation-amination reaction can be ammonia, alkyl mono-amine, dialkyl mono-amine, or polyamine described above. Unless specified otherwise, the amino groups in the amine compounds can be primary amines, secondary amines, tertiary amines or any mixture thereof. These amines may be hydrocarbyl amines or may be hydrocarbyl amines including one or more of other groups, e.g., hydroxy, alkoxy, amide, nitrile, imidazoline, and the like.

Primary amine-containing compounds refers to amine or amino compounds described above that contain at least one primary amine group, i.e., —$NH_2$.

It will be appreciated that other dispersants can be prepared from terminal unsaturated polymers by known chemical reaction at the terminal double bond of a copolymer. Therefore, this invention also includes, in various embodiments, such methods and dispersants prepared therefrom.

As non-limiting examples, a dispersant may be formed by reacting a copolymer as discussed herein with a suitable functional group, for example, via a terminal double bond, to produce a compound such as:

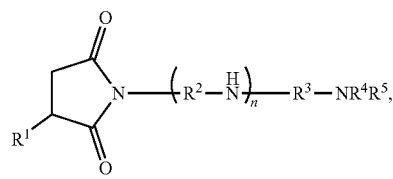

Formula (I)

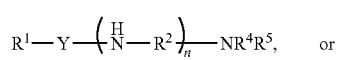

Formula (II)

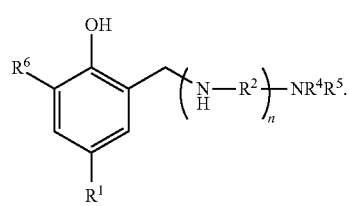

Formula (III)

In these structures, $R^1$ may be a hydrocarbyl radical derived from the copolymer; $R^2$ may be a divalent $C_1$-$C_6$ alkylene; $R^3$ may be a divalent $C_1$-$C_6$ alkylene; each of $R^4$ and $R^5$, independently, may be H, $C_1$-$C_6$ alkyl,

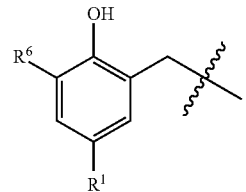

or, together with the N to which they are attached, form a 5 or 6-membered ring optionally fused with an aromatic or non-aromatic ring; $R^6$ may be H or $C_1$-$C_6$ alkyl, or —$CH_2$—(NH—$R^2$)$_n$—$NR^4R^5$; Y may be a covalent bond or C(O); and n may be 0, 1, 2, 3, 4, 5, 6, 7, or 8. These compounds are formed by functionalization reactions such as those described above, e.g., using succinimide functionalization, the Koch reaction, the reductive amination reaction, the halogen-amination reaction, or the Mannich reaction.

Referring to Formula (I) above, the functionalized copolymer can be mono-succinimide, i.e., $NR^4R^5$ together is $NH_2$, or bis-succinimide, i.e., $NR^4R^5$ together is:

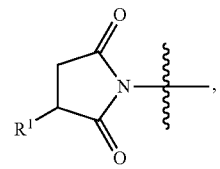

wherein $R^1$ is hydrocarbyl derived from the copolymer as described above.

Referring to Formula (III), the functionalized copolymer can have one of the following structures:

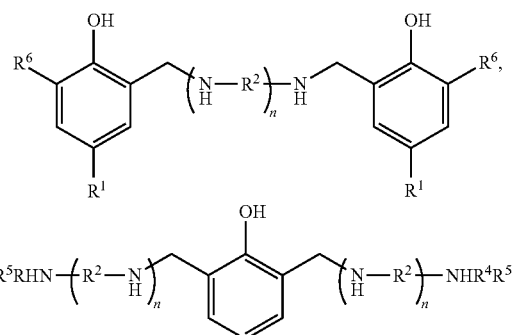

Post-Treatment

The functionalized copolymer may also be post-treated by conventional methods by a reaction with any of a variety of agents, which are known in the art. Among these are boron compounds, urea, thiourea, dimercaptothiadiazoles, carbon disulphide, aldehydes, ketones, carboxylic acids, anhydrides, nitriles, epoxides, cyclic carbonates, and phosphorus compounds. See U.S. Pat. No. 5,241,003.

The boron compound used as a post-treating reagent can be selected from the group consisting of boron oxide, boron halides, boron acids and esters of boron acids in an amount to provide from about 0.1 atomic proportion of boron for each mole of the nitrogen composition to about 20 atomic proportions of boron for each atomic proportion of nitrogen used. The borated derivatized copolymer can contain from about 0.05 to 2.0 wt %, e.g. 0.05 to 0.7 wt % boron based on the total weight of said borated nitrogen-containing dispersant compound.

Carboxylic acid used as a post-treating reagent can be saturated or unsaturated mono-, di-, or poly-carboxylic acid. Examples of carboxylic acid include, but are not limited to, maleic acid, fumaric acid, succinic acid, naphthalic diacid (e.g., 1,8-naphthalic diacid).

Anhydride used as a post-treating reagent can be selected from the group consisting of mono-unsaturated anhydride (e.g., maleic anhydride), alkyl or alkylene-substituted cyclic anhydrides (e.g., succinic anhydride or glutamic anhydride), aromatic carboxylic anhydrides (including naphthalic anhydride, e.g., 1,8-naphthalic anhydride).

Lubricating Oil

According to one or more embodiments, the dispersants described herein comprising a functionalized copolymer may be introduced to a major amount of a base oil to produce a lubricating oil that is configured to pass the MRV test. The lubricating oil may also contain a viscosity index improver. It may further contain a pour point depressant. The TBN of a suitable dispersant may be from about 10 to about 65 on an oil-free basis, which is comparable to about 5 to about 30 TBN if measured on a dispersant sample containing about 50% diluent oil.

According to some embodiments, the lubricating oil comprises a certain weight percentage of the dispersant. In one or more embodiments, the dispersant comprises about 0.1 wt % to about 15 wt %, or about 0.1 wt % to about 10 wt %, or about 3 wt % to about 10 wt %, or about 1 wt % to about 6 wt %, or about 7 wt % to about 12 wt %, based upon the total final weight of the lubricating oil composition. In some embodiments, the lubricating oil composition utilizes a mixed dispersant system. A single type or a mixture of two or more types of dispersants in any desired ratio may be used.

In some other embodiments, the lubricating oil composition is prepared from a lubricating additive package which comprises 30-80 wt % of a dispersant as described above.

According to some embodiments, the lubricating oil comprises a certain weight percentage of the viscosity index improver. According to one or more embodiments, the viscosity index improver comprises less than 1-20 wt %, 3-10 wt %, or 5-9 wt %, based on the total weight of the lubricating oil. Other values are also possible. Other potential components of the lubricating oil are described below.

Base Oil

The base oil used in the lubricating oil compositions herein may be selected from any suitable bale oil. Examples include the base oils in Groups I-V as specified in the American Petroleum Institute (API) Base Oil Interchangeability Guidelines. These five base oil groups are as follows:

TABLE 4

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |

TABLE 4-continued

| Base oil Category | Sulfur (%) | Saturates (%) | Viscosity Index |
|---|---|---|---|
| Group V | All others not included in Groups I, II, III, or IV | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as alpha-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt % the sum of the amount of the performance additives inclusive of viscosity index improver(s) and/or pour point depressant(s) and/or other top treat additives. For example, the oil of lubricating viscosity that may be present in a finished fluid may be a "major amount," such as greater than about 50 wt %, greater than about 60 wt %, greater than about 70 wt %, greater than about 80 wt %, greater than about 85 wt %, greater than about 90 wt %, or greater than 95 wt %.

Viscosity Index Improvers

The lubricating oil compositions herein also may optionally contain one or more viscosity index improvers. Suitable viscosity index improvers may include polyolefins (e.g., polyisobutenes), olefin copolymers (e.g., ethylene/propylene copolymers), hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Pat. Apl. Pub. No. 20120101017A1.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or dispersant viscosity index improver may be about 0.1 wt % to about 20 wt %, about 0.1 wt % to about 15 wt %, about 0.1 wt % to about 12 wt %, about 0.5 wt % to about 10 wt %, about 3 wt % to about 20 wt %, about 3 wt % to about 15 wt %, about 5 wt % to about 15 wt %, or about 5 wt % to about 10 wt %, of the lubricating oil composition. In some embodiments, the viscosity index improver is a polyolefin or olefin copolymer having a number average molecular weight of 10,000-500,000, 50,000-200,000, or 50,000-150,000. In some embodiments, the viscosity index improver is a hydrogenated styrene/butadiene copolymer having a number average molecular weight of 40,000-500,000, 50,000-200,000, or 50,000-150,000. In some embodiments, the viscosity index improver is a polymethacrylate having a number average molecular weight of 10,000-500,000, 50,000-200,000, or 50,000-150,000.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as alpha-olefins.

The one or more antioxidant(s) may be present in ranges about 0 wt % to about 20 wt %, or about 0.1 wt % to about 10 wt %, or about 1 wt % to about 5 wt %, of the lubricating oil composition.

Antiwear Agents

The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 0612839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkylthiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

Boron-Containing Compounds

The lubricating oil compositions herein may optionally contain one or more boron-containing compounds.

Examples of boron-containing compounds include borate esters, borated fatty amines, borated epoxides, borated detergents, and borated dispersants, such as borated succinimide dispersants, as disclosed in U.S. Pat. No. 5,883,057.

The boron-containing compound, if present, can be used in an amount sufficient to provide up to about 8 wt %, about 0.01 wt % to about 7 wt %, about 0.05 wt % to about 5 wt %, or about 0.1 wt % to about 3 wt % of the lubricating oil composition.

Detergents

The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, or phenols.

An overbased detergent of the lubricating oil composition may have a total base number (TBN) of about 200 mg KOH/gram or greater, or as further examples, about 250 mg KOH/gram or greater, or about 350 mg KOH/gram or greater, or about 375 mg KOH/gram or greater, or about 400 mg KOH/gram or greater.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may have a metal to substrate ratio of from 1.1:1, or from 2:1, or from 4:1, or from 5:1, or from 7:1, or from 10:1.

The low-based/neutral detergent has a TBN of up to 175 mg KOH/g, or up to 150 mg KOH/g. The low-based/neutral detergent may include a calcium-containing detergent. The low-based neutral calcium-containing detergent may be selected from a calcium sulfonate detergent, a calcium phenate detergent and a calcium salicylate detergent. In some embodiments, the low-based/neutral detergent is a calcium-containing detergent or a mixture of calcium-containing detergents. In some embodiments, the low-based/neutral detergent is a calcium sulfonate detergent or a calcium phenate detergent.

The low-based/neutral detergent may comprise at least 2.5 wt % of the total detergent in the lubricating oil composition. In some embodiments, at least 4 wt %, or at least 6 wt %, or at least 8 wt %, or at least 10 wt % or at least 12 wt % or at least 20 wt % of the total detergent in the lubricating oil composition is a low-based/neutral detergent which may optionally be a low-based/neutral calcium-containing detergent.

In certain embodiments, the one or more low-based/neutral detergents provide from about 50 to about 1000 ppm calcium by weight to the lubricating oil composition based on a total weight of the lubricating oil composition. In some embodiments, the one or more low-based/neutral calcium-containing detergents provide from 75 to less than 800 ppm, or from 100 to 600 ppm, or from 125 to 500 ppm by weight calcium to the lubricating oil composition based on a total weight of the lubricating oil composition.

In some embodiments, a detergent is effective at reducing or preventing rust in an engine.

The detergent may be present at about 0 wt % to about 10 wt %, or about 0.1 wt % to about 8 wt %, or about 1 wt % to about 4 wt %, or greater than about 4 wt % to about 8 wt %.

Additional Dispersants

Additional dispersants contained in the lubricant composition may include, but are not limited to, an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,634,515, 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

In various embodiments, the additional dispersant may be derived from a polyalphaolefin (PAO) succinic anhydride, an olefin maleic anhydride copolymer. As an example, the additional dispersant may be described as a poly-PIBSA. In another embodiment, the additional dispersant may be derived from an anhydride which is grafted to an ethylene-propylene copolymer. Another additional dispersant may be a high molecular weight ester or half ester amide.

The additional dispersant, if present, can be used in an amount sufficient to provide up to about 10 wt %, based upon the final weight of the lubricating oil composition. Another amount of the dispersant that can be used may be about 0.1 wt % to about 10 wt %, or about 0.1 wt % to about 10 wt %, or about 3 wt % to about 8 wt %, or about 1 wt % to about 6 wt %, based upon the final weight of the lubricating oil composition.

Friction Modifiers

The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt % to about 10 wt %, or about 0.01 wt % to about 8 wt %, or about 0.1 wt % to about 4 wt %.

Molybdenum-Containing Component

The lubricating oil compositions herein also may optionally contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan 822™, Molyvan™ A, Molyvan 2000™ and Molyvan 855™ from R. T. Vanderbilt Co., Ltd., and Sakura-Lube™ S-165, S-200, S-300, S-310G, S-525, S-600, S-700, and S-710 available from Adeka Corporation, and mixtures thereof. Suitable molybdenum components are described in U.S. Pat. No. 5,650,381; U.S. Pat. No. RE 37,363 E1; U.S. Pat. No. RE 38,929 E1; and U.S. Pat. No. RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, each incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds

In another embodiment, the oil-soluble compound may be a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl- (or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and $C_6$ to $C_{25}$ carboxylic acid. The reaction product may be represented by the following formula:

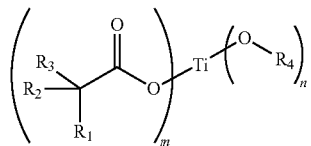

wherein m+n=4; n ranges from 1 to 3; $R_4$ is an alkyl moiety with carbon atoms ranging from 1-8; $R_1$ is selected from a hydrocarbyl group containing from about 6 to 25 carbon atoms; $R_2$, and $R_3$ are the same or different and are selected from a hydrocarbyl group containing from about 1 to 6 carbon atoms; or by the formula:

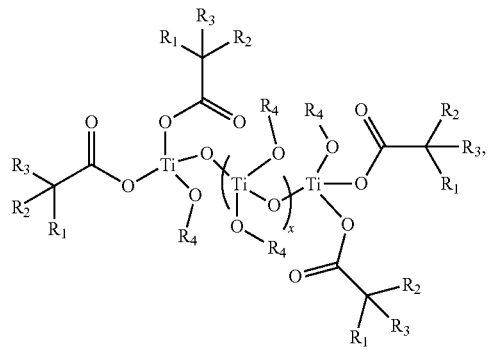

wherein x ranges from 0 to 3; $R_1$ is selected from a hydrocarbyl group containing from about 6 to 25 carbon atoms. $R_2$, and $R_3$ are the same or different and are selected from a hydrocarbyl group containing from about 1 to 6 carbon atoms; and/or $R_4$ is selected from a group consisting of either H, or $C_6$ to $C_{25}$ carboxylic acid moiety. Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Other Optional Additives

Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

In general terms, as an example, a suitable lubricant composition may include additive components in the ranges listed in the following Table 5.

TABLE 5

| Component | Wt % (Suitable Embodiments) | Wt % (Preferred Embodiments) |
|---|---|---|
| Dispersant(s) Combination | 0.1-10% | 1.0-8.5% |
| Antioxidant(s) | 0.1-5.0 | 0.01-3.0 |

TABLE 5-continued

| Component | Wt % (Suitable Embodiments) | Wt % (Preferred Embodiments) |
|---|---|---|
| Detergent(s) | -15.0 | 0.2-8.0 |
| Ashless TBN booster(s) | 0.0-1.0 | 0.01-0.5 |
| Corrosion inhibitor(s) | 0.0-5.0 | 0.0-2.0 |
| Metal dihydrocarbyl dithiophosphate(s) | 0.1-6.0 | 0.1-4.0 |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) | 0.0-20.0 | 0.25-10.0 |
| Dispersant viscosity index improver(s) | 0.0-10.0 | 0.0-5.0 |
| Friction modifier(s) | 0.01-5.0 | 0.05-2.0 |
| Base oil(s) | Balance | Balance |
| Total | 100 | 100 |

The percentages of each component above represent the weight percent of each component, based upon the weight of the total final lubricating oil composition. The balance of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

Fully formulated lubricants conventionally contain an additive package, referred to herein as a dispersant/inhibitor package or DI package, that will supply the characteristics that are required in the formulations. Suitable DI packages are described for example in U.S. Pat. Nos. 5,204,012 and 6,034,040 for example. Among the types of additives included in the additive package may be dispersants, seal swell agents, antioxidants, foam inhibitors, lubricity agents, rust inhibitors, corrosion inhibitors, demulsifiers, viscosity index improvers, and the like. Several of these components are well known to those skilled in the art and are generally used in conventional amounts with the additives and compositions described herein.

In all of the embodiments described herein, the lubricant or additive composition may further comprise one or more of detergents, dispersants, friction modifiers, antioxidants, rust inhibitors, viscosity index improvers, emulsifiers, demulsifiers, corrosion inhibitors, antiwear agents, metal dihydrocarbyl dithiophosphates, ash-free amine phosphate salts, antifoam agents, and pour point depressants and any combination thereof.

Fuel Composition

According to one or more embodiments, the functionalized copolymer described herein may be introduced as a functionalized dispersant (also known as a fuel detergent) along with other additives in gasoline, biodiesel or diesel to produce a fuel composition or a fuel additive composition. According to one or more embodiments, the fuel composition comprises less than 0.5%, or less than 0.1% of a fuel additive composition comprising the functionalized dispersant. Other values are also possible. Embodiments of a fuel composition or a fuel additive composition may contain more than 500 part per million (ppm) of the functionalized fuel dispersant, or less than 300 ppm, or less than 100 ppm, or less than 50 ppm, or less than 10 ppm. Examples of other additives which may be used include, but are not limited to, a corrosion inhibitors or antirust additives, antistatic dispersants, dehazers, demulsifiers, anti-icers, biocides, antifoamants, drag reducers, friction modifiers, antivalve-seat recession additives, phenolic antioxidants, cold flow improvers, combustion improvers, metal deactivators, friction modifiers, conductivity improvers, and pour point depressants. See, e.g., U.S. Pat. No. 5,405,417.

In selecting a functionalized fuel dispersant, it may be important to ensure that the selected dispersant is soluble or stably dispersible in an additive package and finished fuel composition, is compatible with the other components of the composition, and does not interfere significantly with the performance properties of the composition, such as rust inhibition, corrosion inhibition, improved lubricity, and improved lead compatibility, needed or desired, as applicable, in the overall finished fuel composition.

For the sake of convenience, the functionalized fuel dispersant may be provided as a concentrate for dilution. Such a concentrate forms part of the present disclosure and typically comprises from about 99 to about 1% by weight additive and from about 1 to about 99% by weight of solvent or diluent for the additive, which solvent or diluent may be miscible and/or capable of dissolving in gasoline or diesel, in which the concentrate may be used. The solvent or diluent may be gasoline, diesel, mineral oil (either paraffinic or naphthenic oils), aromatic oils, synthetic oils, or derivatives thereof. In general, the functionalized fuel dispersant additive may be employed in minor amounts sufficient to improve the performance characteristics and properties of the base fluid.

It will be appreciated that the individual components employed can be separately blended into the base fluid or can be blended therein in various subcombinations, if desired. Ordinarily, the particular sequence of such blending steps may not be crucial. Moreover, such components can be blended in the form of separate solutions in a diluent. According to various embodiments, however, the additive components may be blended in the form of a concentrate, as this simplifies the blending operations, reduces the likelihood of blending errors, and takes advantage of the compatibility and solubility characteristics afforded by the overall concentrate.

In further embodiments, the invention relates to a method for lubricating an engine by lubricating an engine with a lubricant composition of any of the forgoing embodiments.

In yet a further embodiment, the invention relates to the use of a lubricating composition according to any of the forgoing embodiments to lubricate an engine.

The following definitions of terms are provided in order to clarify the meanings of certain terms as used herein. Additional disclosure of various embodiments of the present invention are also provided below.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, and/or phenols.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(a) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic moiety);

(b) substituted hydrocarbon substituents, that is, substituents containing non-hydrocarbon groups which, in the context of this disclosure, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); and (c) hetero substituents, that is, substituents which, while having a predominantly hydrocarbon character, in the context of this disclosure, contain other than carbon in a ring or chain otherwise composed of carbon atoms. Heteroatoms may include sulfur, oxygen, and nitrogen, and encompass substituents such as pyridyl, furyl, thienyl, and imidazolyl. In general, no more than two, for example, no more than one, non-hydrocarbon substituent will be present for every ten carbon atoms in the hydrocarbyl group; typically, there will be no non-hydrocarbon substituents in the hydrocarbyl group.

As used herein, the term "percent by weight," unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Lubricants, combinations of components, or individual components of the present description may be suitable for use in various types of internal combustion engines. Suitable engine types may include, but are not limited to heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines. Particularly preferred types of engines for which the lubricant compositions of the present invention may be used are heavy duty diesel (HDD) engines.

HDD engines are commonly known to produce soot levels in lubricants in the range of about 2% to about 3%. Additionally, in older model HDD engines the soot level could reach levels of up to about 8%. Additionally, gasoline direct injection (GDi) engines also suffer from soot in their lubricating fluids. A test of a GDi engine using the Ford Chain Wear Test run for 312 hours produced a soot level of 2.387% in the lubricant. Depending on the manufacturer and operating conditions the soot levels in direct fuel injection gasoline engines can be in the range of about 1.5% to about 3%. For comparison a non-direct injection gasoline engine was also tested to determine the soot amounts produced in the lubricant. The results of this test showed only about 1.152% soot in the lubricant.

Based on the higher levels of soot produced by HDD and GDi engines, the present synergistic dispersants are preferred for use with these types of engines. For use in HDD engines and direct fuel injected gasoline engines the soot present in the oil can range from about 0.05% to about 8% depending on the age, manufacturer, and operating conditions of the engine. In some embodiments, the soot level in the lubricating composition is greater than about 1.5%, or preferably the soot level is from about 1.5% to about 8%, and most preferably the soot level in the lubricating fluid is from about 2% to about 3%.

The internal combustion engine may contain components of one or more of an aluminum-alloy, lead, tin, copper, cast iron, magnesium, ceramics, stainless steel, composites, and/or mixtures thereof. The components may be coated, for example, with a diamond-like carbon coating, a lubricated coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricating oil composition for an internal combustion engine may be suitable for any engine lubricant irrespective of the sulfur, phosphorus, or sulfated ash (ASTM D-874) content. The sulfur content of the engine oil lubricant may be about 1 wt % or less, or about 0.8 wt % or less, or about 0.5 wt % or less, or about 0.3 wt % or less, or about 0.2 wt % or less. In one embodiment the sulfur content may be in the range of about 0.001 wt % to about 0.5 wt %, or about 0.01 wt % to about 0.3 wt %. The phosphorus content may be about 0.2 wt % or less, or about 0.1 wt % or less, or about 0.085 wt % or less, or about 0.08 wt % or less, or even about 0.06 wt % or less, about 0.055 wt % or less, or about 0.05 wt % or less. In one embodiment the phosphorus content may be about 50 ppm to about 1000 ppm, or about 325 ppm to about 850 ppm. The total sulfated ash content may be about 2 wt % or less, or about 1.5 wt % or less, or about 1.1 wt % or less, or about 1 wt % or less, or about 0.8 wt % or less, or about 0.5 wt % or less. In one embodiment the sulfated ash content may be about 0.05 wt % to about 0.9 wt %, or about 0.1 wt % or about 0.2 wt % to about 0.45 wt %. In another embodiment, the sulfur content may be about 0.4 wt % or less, the phosphorus content may be about 0.08 wt % or less, and the sulfated ash is about 1 wt % or less. In yet another embodiment the sulfur content may be about 0.3 wt % or less, the phosphorus content is about 0.05 wt % or less, and the sulfated ash may be about 0.8 wt % or less.

In one embodiment the lubricating oil composition is an engine oil, wherein the lubricating oil composition may have (i) a sulfur content of about 0.5 wt % or less, (ii) a phosphorus content of about 0.1 wt % or less, and (iii) a sulfated ash content of about 1.5 wt % or less.

In one embodiment the lubricating oil composition is suitable for a 2-stroke or a 4-stroke marine diesel internal combustion engine. In one embodiment the marine diesel combustion engine is a 2-stroke engine. In some embodiments, the lubricating oil composition is not suitable for a 2-stroke or a 4-stroke marine diesel internal combustion engine for one or more reasons, including but not limited to, the high sulfur content of fuel used in powering a marine engine and the high TBN required for a marine-suitable engine oil (e.g., above about 40 TBN in a marine-suitable engine oil).

In some embodiments, the lubricating oil composition is suitable for use with engines powered by low sulfur fuels, such as fuels containing about 1 to about 5% sulfur. Highway vehicle fuels contain about 15 ppm sulfur (or about 0.0015% sulfur).

Low speed diesel typically refers to marine engines, medium speed diesel typically refers to locomotives, and high speed diesel typically refers to highway vehicles. The lubricating oil composition may be suitable for only one of these types or all.

Further, lubricants of the present description may be suitable to meet one or more industry specification requirements such as ILSAC GF-3, GF-4, GF-5, GF-6, CK-4, FA-4, CJ-4, CI-4 Plus, CI-4, ACEA A1/B1, A2/B2, A3/B3, A3/B4, A5/B5, C1, C2, C3, C4, C5, E4/E6/E7/E9, Euro 5/6, JASO DL-1, Low SAPS, Mid SAPS, or original equipment manufacturer specifications such as Dexos™ 1, Dexos™ 2, MB-Approval 229.51/229.31, VW 502.00, 503.00/503.01, 504.00, 505.00, 506.00/506.01, 507.00, 508.00, 509.00, BMW Longlife-04, Porsche C30, Peugeot Citroën Automobiles B71 2290, B71 2296, B71 2297, B71 2300, B71 2302, B71 2312, B71 2007, B71 2008, Ford WSS-M2C153-H, WSS-M2C930-A, WSS-M2C945-A, WSS-M2C913A, WSS-M2C913-B, WSS-M2C913-C, GM 6094-M, Chrysler MS-6395, or any past or future PCMO or HDD specifications not mentioned herein. In some embodiments for passenger car motor oil (PCMO) applications, the amount of phosphorus in the finished fluid is 1000 ppm or less or 900 ppm or less or 800 ppm or less.

Other hardware may not be suitable for use with the disclosed lubricant. A "functional fluid" is a term which encompasses a variety of fluids including but not limited to tractor hydraulic fluids, power transmission fluids including automatic transmission fluids, continuously variable transmission fluids and manual transmission fluids, hydraulic fluids, including tractor hydraulic fluids, some gear oils, power steering fluids, fluids used in wind turbines, compressors, some industrial fluids, and fluids related to power train components. It should be noted that within each of these fluids such as, for example, automatic transmission fluids, there are a variety of different types of fluids due to the various transmissions having different designs which have led to the need for fluids of markedly different functional characteristics. This is contrasted by the term "lubricating fluid" which is not used to generate or transfer power.

With respect to tractor hydraulic fluids, for example, these fluids are all-purpose products used for all lubricant applications in a tractor except for lubricating the engine. These lubricating applications may include lubrication of gearboxes, power take-off and clutch(es), rear axles, reduction gears, wet brakes, and hydraulic accessories.

When the functional fluid is an automatic transmission fluid, the automatic transmission fluids must have enough friction for the clutch plates to transfer power. However, the friction coefficient of fluids has a tendency to decline due to the temperature effects as the fluid heats up during operation. It is important that the tractor hydraulic fluid or automatic transmission fluid maintain its high friction coefficient at elevated temperatures, otherwise brake systems or automatic transmissions may fail. This is not a function of an engine oil.

Tractor fluids, and for example Super Tractor Universal Oils (STUOs) or Universal Tractor Transmission Oils (UTTOs), may combine the performance of engine oils with transmissions, differentials, final-drive planetary gears, wet-brakes, and hydraulic performance. While many of the additives used to formulate a UTTO or a STUO fluid are similar in functionality, they may have deleterious effect if not incorporated properly. For example, some anti-wear and extreme pressure additives used in engine oils can be extremely corrosive to the copper components in hydraulic pumps. Detergents and dispersants used for gasoline or diesel engine performance may be detrimental to wet brake performance. Friction modifiers specific to quiet wet brake noise, may lack the thermal stability required for engine oil performance. Each of these fluids, whether functional, tractor, or lubricating, are designed to meet specific and stringent manufacturer requirements.

Engine oils as discussed herein may be formulated by the addition of one or more additives, as described in detail below, to an appropriate base oil formulation. The additives may be combined with a base oil in the form of an additive package (or concentrate) or, alternatively, may be combined individually with a base oil (or a mixture of both). The fully formulated engine oil may exhibit improved performance properties, based on the additives added and their respective proportions.

The details and advantages of the disclosure may be realized and attained by means of the elements and combinations particularly pointed out in the appended claims. It is to be understood that the descriptions herein are exemplary and explanatory only and are not restrictive of the disclosure, as claimed.

All patents and publications cited herein are fully incorporated by reference herein in their entirety.

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure.

EXAMPLES

An Anton-Paar model MCR302 Rheometer was used to simultaneously measure the viscous and elastic properties of oils as they were cooled at approximately 1° C. per minute. All measurements were made using parallel-plate geometry. To eliminate moisture condensation on the sample and plates, the system was housed in a thermally controlled hood with a nitrogen purge. The rheometer was operated in the oscillatory mode with angular frequency of 2 radians per second and angular displacement of 1 milli-radians. All data were collected in the linear viscoelastic region.

Example 1

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.127 wt % $Cp_2ZrCl_2$ in toluene), cocatalyst (5.0 wt % MMAO in toluene), solvent (toluene), and olefin monomers. The reactor was operated liquid-full at 70 psig and agitated with a four-blade pitched-turbine impeller operating at 220 rpm. The catalyst and co-catalyst solutions were mixed immediately before introduction to the reactor at a feed rate of 0.90 and 0.90 g/min, respectively. The ethylene, propylene and toluene were also mixed together and fed to the reactor separate from the catalyst and cocatalyst solutions at a feed rate of 2.71, 15.22 and 11.71 g/min, respectively. The reactor temperature was maintained at 65° C. as measured by a ⅛ inch thermocouple in the reactor. The production rate of copolymer was measured gravimetrically at 2.78 g/min.

The copolymer composition was measured to be 49 mol % ethylene by $^1$H-NMR. The copolymer relative number average molecular weight and PDI measured by GPC was 1159 g/mol and 3.73, respectively. The copolymer molecular weight measured by $^1$H-NMR was 1038 g/mol and the copolymer olefin distribution by $^1$H-NMR was 96.5% me-vinylidene, 1.6% beta-vinylidene, 1.3% disubstituted and 0.6% vinyl/allyl. The average ethylene run length measured by $^{13}$C-NMR was 1.68. The crossover temperature measured by oscillatory rheometry was less than the instrument limit of approximately −73.5° C.

Example 2

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.127 wt % $Cp_2ZrCl_2$ in toluene), cocatalyst (5.0 wt % MMAO in toluene), solvent (toluene), and olefin monomers. The reactor was operated liquid-full at 70 psig and agitated with a four-blade pitched-turbine impeller operating at 220 rpm. The catalyst and co-catalyst solutions were mixed immediately before introduction to the reactor at a feed rate of 0.87 and 0.87 g/min, respectively. The ethylene, propylene and toluene were also mixed together and fed to the reactor separate from the catalyst and cocatalyst solutions at a feed rate of 2.78, 15.51 and 10.65 g/min, respectively. The reactor temperature was maintained at 68° C. as measured by a ⅛ inch thermocouple in the reactor. The production rate of copolymer was measured gravimetrically at 3.22 g/min.

The copolymer composition was measured to be 46 mol % ethylene by $^1$H-NMR. The copolymer relative number average molecular weight and PDI measured by GPC was 1466 g/mol and 2.22, respectively. The copolymer molecular weight measured by $^1$H-NMR was 780 g/mol and the copolymer olefin distribution by $^1$H-NMR was 96.0% me-vinylidene, 1.8% beta-vinylidene, 1.3% disubstituted and 0.9% vinyl/allyl. The average ethylene run length measured by $^{13}$C-NMR was 1.54. The crossover temperature measured by oscillatory rheometry was less than the instrument limit of approximately −77.6° C.

Example 3

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.077 wt % $Cp_2ZrCl_2$ in toluene), cocatalyst (1.248 wt % MMAO in toluene), solvent (toluene), and olefin monomers. The reactor was operated liquid-full at 763 psig and agitated with a four-blade pitched-turbine impeller operating at 900 rpm. The catalyst and co-catalyst solutions were mixed immediately before introduction to the reactor at a feed rate of 1.02 and 0.82 g/min, respectively. The ethylene, propylene and toluene were also mixed together and fed to the reactor separate from the catalyst and cocatalyst solutions at a feed rate of 2.23, 3.30 and 9.31 g/min, respectively. The reactor temperature was maintained at 76° C. as measured by a ⅛ inch thermocouple in the reactor. The production rate of copolymer was measured gravimetrically at 3.57 g/min.

The copolymer composition was measured to be 65 mol % ethylene by $^1$H-NMR. The copolymer relative number average molecular weight and PDI measured by GPC was 2085 g/mol and 3.42, respectively. The copolymer molecular weight measured by $^1$H-NMR was 1645 g/mol and the copolymer olefin distribution by $^1$H-NMR was 95.1% me-vinylidene, 1.8% beta-vinylidene, 1.3% disubstituted and 1.8% vinyl/allyl. The average ethylene run length measured by $^{13}$C-NMR was 2.60. The crossover temperature measured by oscillatory rheometry was −24.5° C.

Example 4

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.075 wt % Cp$_2$ZrCl$_2$ in toluene), cocatalyst (1.0 wt % MMAO in toluene), solvent (toluene), and olefin monomers. The reactor was operated liquid-full at 708 psig and agitated with a four-blade pitched-turbine impeller operating at 1000 rpm. The catalyst and co-catalyst solutions were mixed immediately before introduction to the reactor at a feed rate of 0.89 and 0.91 g/min, respectively. The ethylene, propylene and toluene were also mixed together and fed to the reactor separate from the catalyst and cocatalyst solutions at a feed rate of 2.23, 3.59 and 9.36 g/min, respectively. The reactor temperature was maintained at 75° C. as measured by a ⅛ inch thermocouple in the reactor. The production rate of copolymer was measured gravimetrically at 3.47 g/min.

The copolymer composition was measured to be 65 mol % ethylene by $^1$H-NMR. The copolymer relative number average molecular weight and PDI measured by GPC was 2326 g/mol and 3.35, respectively. The copolymer molecular weight measured by $^1$H-NMR was 1824 g/mol and the copolymer olefin distribution by $^1$H-NMR was 95.6% me-vinylidene, 1.7% beta-vinylidene, 1.1% disubstituted and 1.6% vinyl/allyl. The average ethylene run length measured by $^{13}$C-NMR was 2.52. The crossover temperature measured by oscillatory rheometry was −27.0° C.

Example 5

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.150 wt % Cp$_2$ZrCl$_2$ in toluene), cocatalyst (2.0 wt % MMAO in toluene), solvent (toluene), and olefin monomers. The reactor was operated liquid-full at 715 psig and agitated with a four-blade pitched-turbine impeller operating at 1000 rpm. The catalyst and co-catalyst solutions were mixed immediately before introduction to the reactor at a feed rate of 1.28 and 1.26 g/min, respectively. The ethylene, propylene and toluene were also mixed together and fed to the reactor separate from the catalyst and cocatalyst solutions at a feed rate of 2.23, 2.60 and 9.38 g/min, respectively. The reactor temperature was maintained at 75° C. as measured by a ⅛ inch thermocouple in the reactor. The production rate of copolymer was measured gravimetrically at 3.4 g/min.

The copolymer composition was measured to be 64 mol % ethylene by $^1$H-NMR. The copolymer relative number average molecular weight and PDI measured by GPC was 1241 g/mol and 3.00, respectively. The copolymer molecular weight measured by $^1$H-NMR was 1114 g/mol and the copolymer olefin distribution by $^1$H-NMR was 95.5% me-vinylidene, 1.9% beta-vinylidene, 1.3% disubstituted and 1.4% vinyl/allyl. The average ethylene run length measured by $^{13}$C-NMR was 2.39. The crossover temperature measured by oscillatory rheometry was −35.8° C.

Example 6

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.167 wt % Cp$_2$ZrCl$_2$ in toluene), cocatalyst (2.222 wt % MMAO in toluene), solvent (toluene), and olefin monomers. The reactor was operated liquid-full at 696 psig and agitated with a four-blade pitched-turbine impeller operating at 1000 rpm. The catalyst and co-catalyst solutions were mixed immediately before introduction to the reactor at a feed rate of 0.66 and 0.65 g/min, respectively. The ethylene, propylene and toluene were also mixed together and fed to the reactor separate from the catalyst and cocatalyst solutions at a feed rate of 3.09, 8.11 and 3.10 g/min, respectively. The reactor temperature was maintained at 80° C. as measured by a ⅛ inch thermocouple in the reactor. The production rate of copolymer was measured gravimetrically at 6.63 g/min.

The copolymer composition was measured to be 58 mol % ethylene by $^1$H-NMR. The copolymer relative number average molecular weight and PDI measured by GPC was 3202 g/mol and 2.03, respectively. The copolymer molecular weight measured by $^1$H-NMR was 1310 g/mol and the copolymer olefin distribution by $^1$H-NMR was 95.7% me-vinylidene, 1.5% beta-vinylidene, 1.6% disubstituted and 1.2% vinyl/allyl. The average ethylene run length measured by $^{13}$C-NMR was 2.02. The crossover temperature measured by oscillatory rheometry was −72.7° C.

Example 7

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.165 wt % Cp$_2$ZrCl$_2$ in toluene), cocatalyst (2.2 wt % MMAO in toluene), solvent (toluene), and olefin monomers. The reactor was operated liquid-full at 703 psig and agitated with a four-blade pitched-turbine impeller operating at 1000 rpm. The catalyst and co-catalyst solutions were mixed immediately before introduction to the reactor at a feed rate of 1.21 and 1.20 g/min, respectively. The ethylene, propylene and toluene were also mixed together and fed to the reactor separate from the catalyst and cocatalyst solutions at a feed rate of 2.23, 2.51 and 8.50 g/min, respectively. The reactor temperature was maintained at 75° C. as measured by a ⅛ inch thermocouple in the reactor. The production rate of copolymer was measured gravimetrically at 3.48 g/min.

The copolymer composition was measured to be 68 mol % ethylene by $^1$H-NMR. The copolymer relative number average molecular weight and PDI measured by GPC was 2838 g/mol and 1.87, respectively. The copolymer molecular weight measured by $^1$H-NMR was 1203 g/mol and the copolymer olefin distribution by $^1$H-NMR was 94.6% me-vinylidene, 2.1% beta-vinylidene, 1.3% disubstituted and 2.0% vinyl/allyl. The average ethylene run length measured by $^{13}$C-NMR was 2.72. The crossover temperature measured by oscillatory rheometry was −13.7° C.

Example 8

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.182 wt % $Cp_2ZrCl_2$ in toluene), cocatalyst (2.42 wt % MMAO in toluene), solvent (toluene), and olefin monomers. The reactor was operated liquid-full at 704 psig and agitated with a four-blade pitched-turbine impeller operating at 1000 rpm. The catalyst and co-catalyst solutions were mixed immediately before introduction to the reactor at a feed rate of 1.15 and 1.14 g/min, respectively. The ethylene, propylene and toluene were also mixed together and fed to the reactor separate from the catalyst and cocatalyst solutions at a feed rate of 2.20, 2.40 and 7.97 g/min, respectively. The reactor temperature was maintained at 75° C. as measured by a ⅛ inch thermocouple in the reactor. The production rate of copolymer was measured gravimetrically at 3.53 g/min.

The copolymer composition was measured to be 67 mol % ethylene by $^1$H-NMR. The copolymer relative number average molecular weight and PDI measured by GPC was 2269 g/mol and 2.17, respectively. The copolymer molecular weight measured by $^1$H-NMR was 1167 g/mol and the copolymer olefin distribution by $^1$H-NMR was 94.6% me-vinylidene, 2.2% beta-vinylidene, 1.3% disubstituted and 1.9% vinyl/allyl. The average ethylene run length measured by $^{13}$C-NMR was 2.65. The crossover temperature measured by oscillatory rheometry was −18.5° C.

Example 9

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.167 wt % $Cp_2ZrCl_2$ in toluene), cocatalyst (2.222 wt % MMAO in toluene), solvent (toluene), and olefin monomers. The reactor was operated liquid-full at 701 psig and agitated with a four-blade pitched-turbine impeller operating at 1000 rpm. The catalyst and co-catalyst solutions were mixed immediately before introduction to the reactor at a feed rate of 0.78 and 0.89 g/min, respectively. The ethylene, propylene and toluene were also mixed together and fed to the reactor separate from the catalyst and cocatalyst solutions at a feed rate of 3.34, 7.77 and 3.20 g/min, respectively. The reactor temperature was maintained at 89° C. as measured by a ⅛ inch thermocouple in the reactor. The production rate of copolymer was measured gravimetrically at 7.98 g/min.

The copolymer composition was measured to be 56 mol % ethylene by $^1$H-NMR. The copolymer relative number average molecular weight and PDI measured by GPC was 3173 g/mol and 2.02, respectively. The copolymer molecular weight measured by $^1$H-NMR was 1281 g/mol and the copolymer olefin distribution by $^1$H-NMR was 94.9% me-vinylidene, 2.0% beta-vinylidene, 1.8% disubstituted and 1.3% vinyl/allyl. The average ethylene run length measured by $^{13}$C-NMR was 2.05. The crossover temperature measured by oscillatory rheometry was lower than −37° C.

Example 10

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.011 wt % $Cp_2ZrMe_2$ in toluene), cocatalyst (0.023 wt % FAB in toluene), scavenger (0.0080 wt % TEAL in toluene), solvent (toluene), and olefin monomers. The reactor was operated liquid-full at 1520 psig and agitated with a four-blade pitched-turbine impeller operating at 1041 rpm. The catalyst, co-catalyst and scavenger solutions were mixed immediately before introduction to the reactor at a feed rate of 0.31, 0.32 and 0.52 g/min, respectively. The ethylene, propylene and toluene were also mixed together and fed to the reactor separate from the catalyst, cocatalyst and scavenger solutions at a feed rate of 0.60, 2.98 and 6.31 g/min, respectively. The reactor temperature was maintained at 134° C. as measured by a ⅛ inch thermocouple in the reactor. The production rate of copolymer was measured gravimetrically at 0.96 g/min.

The copolymer composition was measured to be 55 mol % ethylene by $^1$H-NMR. The copolymer relative number average molecular weight and PDI measured by GPC was 2883 g/mol and 2.05, respectively. The copolymer molecular weight measured by $^1$H-NMR was 1411 g/mol and the copolymer olefin distribution by $^1$H-NMR was 76.6% me-vinylidene, 14.1% beta-vinylidene, 7.2% disubstituted and 2.1% vinyl/allyl. The average ethylene run length measured by $^{13}$C-NMR was 2.60. The crossover temperature measured by oscillatory rheometry was −22.4° C.

Example 11

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.141 wt % $Cp_2ZrMe_2$ in toluene), cocatalyst (0.144 wt % FAB in toluene), scavenger (0.032 wt % TEAL in toluene), solvent (toluene), and olefin monomers. The reactor was operated liquid-full at 1553 psig and agitated with a four-blade pitched-turbine impeller operating at 1000 rpm. The catalyst, co-catalyst and scavenger solutions were mixed immediately before introduction to the reactor at a feed rate of 0.22, 0.49 and 0.25 g/min, respectively. The ethylene, propylene and toluene were also mixed together and fed to the reactor separate from the catalyst, cocatalyst and scavenger solutions at a feed rate of 1.75, 2.55 and 7.04 g/min, respectively. The reactor temperature was maintained at 120° C. as measured by a ⅛ inch thermocouple in the reactor. The production rate of copolymer was measured gravimetrically at 2.53 g/min.

The copolymer composition was measured to be 62 mol % ethylene by $^1$H-NMR. The copolymer relative number average molecular weight and PDI measured by GPC was 2318 g/mol and 1.98, respectively. The copolymer molecular weight measured by $^1$H-NMR was 1199 g/mol and the copolymer olefin distribution by $^1$H-NMR was 75.6% me-vinylidene, 16.8% beta-vinylidene, 6.3% disubstituted and 1.4% vinyl/allyl. The average ethylene run length measured by $^{13}$C-NMR was 2.22. The crossover temperature measured by oscillatory rheometry was lower than −37° C.

Example 12

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.04 wt % $Cp_2ZrMe_2$ in toluene), cocatalyst (0.083 wt % FAB in toluene), scavenger (0.005 wt % TEAL in toluene), solvent (toluene), and olefin monomers. The reactor was operated liquid-full at 1533 psig and agitated with a four-blade pitched-turbine impeller operating at 1000 rpm. The catalyst, co-catalyst and scavenger solutions were mixed immediately before introduction to the reactor at a feed rate of 0.32, 0.34 and 0.33 g/min, respectively. The ethylene, propylene and toluene were also mixed together and fed to the reactor separate from the catalyst, cocatalyst and scavenger solutions at a feed rate of 1.60, 3.05 and 3.68 g/min, respectively. The reactor temperature was maintained at 98° C. as measured by a ⅛ inch thermocouple in the reactor. The production rate of copolymer was measured gravimetrically at 3.69 g/min.

The copolymer composition was measured to be 45 mol % ethylene by $^1$H-NMR. The copolymer relative number average molecular weight and PDI measured by GPC was 2628 g/mol and 2.00, respectively. The copolymer molecular weight measured by $^1$H-NMR was 1410 g/mol and the copolymer olefin distribution by $^1$H-NMR was 81.2% me-vinylidene, 13.0% beta-vinylidene, 5.2% disubstituted and 0.6% vinyl/allyl. The average ethylene run length measured by $^{13}$C-NMR was 1.62. The crossover temperature measured by oscillatory rheometry was lower than −37° C.

Example 13

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.04 wt % $Cp_2ZrMe_2$ in toluene), cocatalyst (0.082 wt % FAB in toluene), scavenger (0.01 wt % TEAL in toluene), solvent (toluene), and olefin monomers. The reactor was operated liquid-full at 1533 psig and agitated with a four-blade pitched-turbine impeller operating at 1019 rpm. The catalyst, co-catalyst and scavenger solutions were mixed immediately before introduction to the reactor at a feed rate of 0.52, 0.52 and 0.37 g/min, respectively. The ethylene, propylene and toluene were also mixed together and fed to the reactor separate from the catalyst, cocatalyst and scavenger solutions at a feed rate of 1.78, 2.76 and 3.98 g/min, respectively. The reactor temperature was maintained at 119° C. as measured by a ⅛ inch thermocouple in the reactor. The production rate of copolymer was measured gravimetrically at 3.5 g/min.

The copolymer composition was measured to be 54 mol % ethylene by $^1$H-NMR. The copolymer relative number average molecular weight and PDI measured by GPC was 1673 g/mol and 1.97, respectively. The copolymer molecular weight measured by $^1$H-NMR was 913 g/mol and the copolymer olefin distribution by $^1$H-NMR was 79.2% me-vinylidene, 14.7% beta-vinylidene, 5.0% disubstituted and 1.1% vinyl/allyl. The average ethylene run length measured by $^{13}$C-NMR was 1.99. The crossover temperature measured by oscillatory rheometry was lower than −37° C.

Example 14

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.093 wt % $Cp_2ZrMe_2$ in toluene), cocatalyst (0.191 wt % FAB in toluene), scavenger (0.011 wt % TEAL in toluene), solvent (toluene), and olefin monomers. The reactor was operated liquid-full at 1462 psig and agitated with a four-blade pitched-turbine impeller operating at 1000 rpm. The catalyst, co-catalyst and scavenger solutions were mixed immediately before introduction to the reactor at a feed rate of 0.65, 0.68 and 0.63 g/min, respectively. The ethylene, propylene and toluene were also mixed together and fed to the reactor separate from the catalyst, cocatalyst and scavenger solutions at a feed rate of 1.70, 2.20 and 6.85 g/min, respectively. The reactor temperature was maintained at 105° C. as measured by a ⅛ inch thermocouple in the reactor. The production rate of copolymer was measured gravimetrically at 2.63 g/min.

The copolymer composition was measured to be 67 mol % ethylene by $^1$H-NMR. The copolymer relative number average molecular weight and PDI measured by GPC was 3004 g/mol and 2.04, respectively. The copolymer molecular weight measured by $^1$H-NMR was 1504 g/mol and the copolymer olefin distribution by $^1$H-NMR was 83.0% me-vinylidene, 11.0% beta-vinylidene, 5.0% disubstituted and 2.0% vinyl/allyl. The average ethylene run length measured by $^{13}$C-NMR was 2.64. The crossover temperature measured by oscillatory rheometry was −20.0° C.

Example 15

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.008 wt % $Cp_2ZrMe_2$ in toluene), cocatalyst (0.015 wt % FAB in toluene), scavenger (0.011 wt % TEAL in toluene), solvent (toluene), and olefin monomers. The reactor was operated liquid-full at 1549 psig and agitated with a four-blade pitched-turbine impeller operating at 1008 rpm. The catalyst, co-catalyst and scavenger solutions were mixed immediately before introduction to the reactor at a feed rate of 0.37, 0.40 and 0.27 g/min, respectively. The ethylene, propylene and toluene were also mixed together and fed to the reactor separate from the catalyst, cocatalyst and scavenger solutions at a feed rate of 0.48, 3.0 and 6.98 g/min, respectively. The reactor temperature was maintained at 140° C. as measured by a ⅛ inch thermocouple in the reactor. The production rate of copolymer was measured gravimetrically at 0.61 g/min.

The copolymer composition was measured to be 57 mol % ethylene by $^1$H-NMR. The copolymer relative number average molecular weight and PDI measured by GPC was 3000 g/mol and 2.23, respectively. The copolymer molecular weight measured by $^1$H-NMR was 1505 g/mol and the copolymer olefin distribution by $^1$H-NMR was 76.6% me-vinylidene, 13.7% beta-vinylidene, 7.6% disubstituted and 2.1% vinyl/allyl. The average ethylene run length measured by $^{13}$C-NMR was 2.59. The crossover temperature measured by oscillatory rheometry was 0.7° C.

Example 16

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.015 wt % Cp$_2$ZrMe$_2$ in toluene), cocatalyst (0.031 wt % FAB in toluene), scavenger (0.009 wt % TEAL in toluene), solvent (toluene), and olefin monomers. The reactor was operated liquid-full at 1539 psig and agitated with a four-blade pitched-turbine impeller operating at 1001 rpm. The catalyst, co-catalyst and scavenger solutions were mixed immediately before introduction to the reactor at a feed rate of 0.26, 0.26 and 0.46 g/min, respectively. The ethylene, propylene and toluene were also mixed together and fed to the reactor separate from the catalyst, cocatalyst and scavenger solutions at a feed rate of 0.52, 3.04 and 6.62 g/min, respectively. The reactor temperature was maintained at 140° C. as measured by a ⅛ inch thermocouple in the reactor. The production rate of copolymer was measured gravimetrically at 0.64 g/min.

The copolymer composition was measured to be 57 mol % ethylene by $^1$H-NMR. The copolymer relative number average molecular weight and PDI measured by GPC was 2331 g/mol and 2.38, respectively. The copolymer molecular weight measured by $^1$H-NMR was 1197 g/mol and the copolymer olefin distribution by $^1$H-NMR was 76.9% mevinylidene, 14.4% beta-vinylidene, 6.9% disubstituted and 1.8% vinyl/allyl. The average ethylene run length measured by $^{13}$C-NMR was 2.57. The crossover temperature measured by oscillatory rheometry was −17.8° C.

The following table summarizes some of the above experiments.

unreacted maleic anhydride was removed in vacuo. Analytical analysis: acid number: 0.966 and 91.0% functionalized copolymer.

ASA Example 2

Ethylene propylene copolymer (Example 2) 150 g (0.19 mol) and maleic anhydride 28.3 g (0.29 mol) were charged to 350 mL PARR pressure reactor equipped with a stirrer and a thermocouple. The reaction mixture was heated to 50° C. purged with nitrogen for 15 min with stirring. The reactor temperature was raised to 235° C. and maintained at that temperature for 6 h while stirring. The reaction mixture was then cooled to 90° C. and transferred to a 500 mL round bottom flask. The reaction mixture was then heated and the unreacted maleic anhydride was removed in vacuo. Analytical analysis: acid number: 1.24, and 91.6% functionalized copolymer.

ASA Example 3

Ethylene propylene copolymer (Example 3) 822.5 g (0.5 mol) and maleic anhydride 73.55 g (0.75 mol) were charged to 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording

TABLE 6

| Example | Ethylene (mol %) | EEE (%) | PEE + EEP (%) | PEP (%) | EPE (%) | EPP + PPE (%) | PPP (%) | $N_{C2}$ | $T_{Crossover}$ (° C.) | Vinylidene (%) | Mn GPC (g/mol) | MW (g/mol) | PDI |
|---|---|---|---|---|---|---|---|---|---|---|---|---|---|
| 1 | 48.6 | 7.1 | 28.4 | 15.2 | 20.9 | 16.9 | 11.5 | 1.68 | −73.50 | 96.5 | 1159 | 4326 | 3.73 |
| 2 | 46.2 | 2.5 | 28.2 | 16.7 | 20.6 | 20.3 | 11.8 | 1.54 | −77.60 | 96.0 | 1466 | 3249 | 2.22 |
| 3 | 64.9 | 25.4 | 31.7 | 9.9 | 20.6 | 10.3 | 2.2 | 2.60 | −24.50 | 95.1 | 2085 | 7140 | 3.42 |
| 4 | 65.1 | 24.2 | 32.1 | 10.5 | 21.5 | 10.2 | 1.5 | 2.52 | −27.00 | 95.6 | 2326 | 7783 | 3.35 |
| 5 | 64.0 | 21.4 | 33.2 | 10.7 | 21.9 | 11.0 | 1.7 | 2.39 | −35.80 | 95.5 | 1241 | 3728 | 3.00 |
| 6 | 57.8 | 14.2 | 31.6 | 13.6 | 22.5 | 13.7 | 4.4 | 2.02 | −72.70 | 95.7 | 3202 | 6516 | 2.03 |
| 7 | 67.8 | 27.5 | 32.8 | 9.1 | 21.0 | 9.0 | 0.6 | 2.72 | −13.70 | 94.6 | 2838 | 5318 | 1.87 |
| 8 | 67.2 | 26.3 | 33.1 | 9.4 | 21.1 | 9.8 | 0.3 | 2.65 | −18.50 | 94.6 | 2269 | 4933 | 2.17 |
| 9 | 56.4 | 14.1 | 31.5 | 12.6 | 21.2 | 14.4 | 6.2 | 2.05 | <−37 | 94.9 | 3173 | 6948 | 2.19 |
| 10 | 55 | 22 | 28 | 9 | 17 | 12 | 13 | 2.60 | −22.4 | 76.6 | 2883 | 5901 | 2.05 |
| 11 | 62 | 18 | 33 | 12 | 22 | 12 | 2 | 2.22 | <−37 | 75.6 | 2318 | 4583 | 1.98 |
| 12 | 45 | 6 | 26 | 17 | 20 | 20 | 12 | 1.62 | <−37 | 81.2 | 2628 | 5260 | 2.00 |
| 13 | 54 | 12 | 32 | 12 | 21 | 15 | 8 | 1.99 | <−37 | 79.2 | 1673 | 3292 | 1.97 |
| 14 | 67 | 26 | 33 | 9 | 21 | 10 | 1 | 2.64 | −20 | 83 | 3004 | 6139 | 2.04 |
| 15 | 57 | 23 | 27 | 10 | 17 | 12 | 12 | 2.59 | 0.7 | 76.6 | 3000 | 6690 | 2.23 |
| 16 | 57 | 23 | 28 | 9 | 17 | 12 | 11 | 2.57 | −17.78 | 76.9 | 2331 | 5536 | 2.38 |

ETHYLENE ALPHA OLEFIN COPOLYMER FUNCTIONALIZATION EXAMPLES

ASA Example 1

Ethylene propylene copolymer (Example 1) 168.5 g (0.16 mol) and maleic anhydride 23.5 g (0.24 mol) were charged to 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL round bottom flask. The reaction mixture was then heated and the 827.5 g of product. Analytical analysis: acid number: 0.577 and 85.4% functionalized copolymer.

ASA Example 4

Ethylene propylene copolymer (Example 4) 900 g (0.49 mol) and maleic anhydride 72.65 g (0.74 mol) were charged to 2 L PARR pressure reactor equipped with a stirrer and a thermocouple. The reaction mixture was heated to 50° C. purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 901.4 g of product. Analytical analysis: acid number: 0.571 and 84.8% functionalized copolymer.

ASA Example 5

Ethylene propylene copolymer (Example 5) 781 g (0.7 mol) and maleic anhydride 103.1 g (1.05 mol) were charged to 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 1 L round bottom flask. The reaction mixture was then heated and the unreacted maleic anhydride was removed in vacuo affording 846.5 g of product. Analytical analysis: acid number: 0.986 and 88.6% functionalized copolymer.

ASA Example 6

Ethylene propylene copolymer (Example 6) 1000 g (0.76 mol) and maleic anhydride 112.3 g (1.15 mol) were charged to 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 1076.8 g of product. Analytical analysis: acid number: 0.76, and 78% functionalized copolymer.

ASA Example 7

Ethylene propylene copolymer (Example 7) 450 g (0.374 mol), ethylene propylene copolymer (Example 8) 450 g (0.386 mol) and maleic anhydride 111.79 g (1.14 mol) were charged to 2 L PARR pressure reactor equipped with a stirrer and a thermocouple. The reaction mixture was heated to 50 C, purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 960.2 g of product. Analytical analysis: acid number: 0.923 and 87.0% functionalized copolymer.

ASA Example 8

Ethylene propylene copolymer (Example 9) 845.2 g (0.66 mol) and maleic anhydride 97.0 g (0.99 mol) were charged to 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L 3N-round bottom flask. The reaction mixture was then heated and the unreacted maleic anhydride was removed in vacuo affording 904.2 g of product. Analytical analysis: acid number: 0.858 and 82.2% functionalized copolymer.

ASA Example 9

Ethylene propylene copolymer (Example 10) 150.0 (0.11 mol) and maleic anhydride 15.7 g (0.159 mol) were charged to 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 155.3 g of product. Analytical analysis: acid number: 0.72 and 85.6% functionalized copolymer.

ASA Example 10

Ethylene propylene copolymer (Example 11) 150.0 g (0.125 mol) and maleic anhydride 18.4 g (0.19 mol) were charged to 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 159.5 g of product. Analytical analysis: acid number: 0.78 and 81.3% functionalized copolymer

ASA Example 11

Ethylene propylene copolymer (Example 12) 150.0 g (0.11 mol) and maleic anhydride 15.7 g (0.160 mol) were charged to 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 155.6 g of product. Analytical analysis: acid number: 0.685 and 85.3% functionalized copolymer.

ASA Example 12

Ethylene propylene copolymer (Example 13) 1000 g (1.1 mol) and maleic anhydride 161.2 (1.64 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 1108.5 g of product. Analytical analysis: acid number: 1.057, and 83.8% functionalized copolymer

SUCCINIMIDE EXAMPLES

Dispersant Example 1

EPSA (ASA Example 1) 62.3 g (0.06 mol) was charged to a 250 mL three-necked flask equipped with an overhead stirrer, Dean-Stark trap and condenser. The EPSA was stirred and heated to 160° C. under nitrogen. Tetraethylene pentamine 6.3 g (0.033 mol) was added drop wise via an addition funnel. The reaction mixture was stirred with heating under a vacuum for 3 h. At that time 56.3 g of process oil was added and the reaction product was filtered using a pressure filter to afford 102 g of succinimide product.

Dispersant Example 2

EPSA (ASA Example 2) 64.4 g (0.08 mol) was charged to a 250 mL three-necked flask equipped with an overhead stirrer, Dean-Stark trap and condenser. The EPSA was stirred and heated to 160° C. under nitrogen. Tetraethylene pentamine 8.4 g (0.044 mol) was added drop wise via an addition funnel. The reaction mixture was stirred with heating under a vacuum for 3 h. At that time 60.5 g of process oil was added and the reaction product was filtered using a pressure filter to afford 110 g of succinimide product.

Dispersant Example 3

EPSA (ASA Example 3) 769.8 g (0.44 mol) was charged to a 2 L resin kettle equipped with an overhead stirrer, Dean-Stark trap and condenser. The EPSA was stirred and heated to 160° C. under nitrogen. Tetraethylene pentamine 46.7 g (0.247 mol) was added drop wise via an addition funnel. The reaction mixture was stirred with heating under a vacuum for 3 h. At that time 584.1 g of process oil was added and the reaction product was filtered using a pressure filter to afford 1363 g of succinimide product.

Dispersant Example 4

EPSA (ASA Example 5) 770.8 g (0.76 mol) was charged to a 2 L resin kettle equipped with an overhead stirrer, Dean-Stark trap and condenser. The EPSA was stirred and heated to 160° C. under nitrogen. Tetraethylene pentamine 79.8 g (0.42 mol) was added drop wise via an addition funnel. The reaction mixture was stirred with heating under a vacuum for 3 h. At that time 660.9 g of process oil was added and the reaction product was filtered using a pressure filter to afford 1431.7 g of succinimide product.

Dispersant Example 5

EPSA (ASA Example 6) 1032.8 g (0.786 mol) was charged to a 2 L resin kettle equipped with an overhead stirrer, Dean-Stark trap and condenser. The EPSA was stirred and heated to 160° C. under nitrogen. Tetraethylene pentamine 82.5 g (0.44 mol) was added drop wise via an addition funnel. The reaction mixture was stirred with heating under a vacuum for 3 h. At that time 645.8 g of process oil was added and the reaction product was filtered using a pressure filter to afford 1647.5 g of succinimide product.

Dispersant Example 6

EPSA (ASA Example 7) 872.1 g (0.525 mol) was charged to a 2 L resin kettle equipped with an overhead stirrer, Dean-Stark trap and condenser. The EPSA was stirred and heated to 160° C. under nitrogen. Tetraethylene pentamine 55.2 g (0.29 mol) was added drop wise via an addition funnel. The reaction mixture was stirred with heating under a vacuum for 3 h. At that time 593.8 g of process oil was added and the reaction product was filtered using in a pressure filter to afford 1394 g of succinimide product.

Dispersant Example 7

EPSA (ASA Example 8) 886.8 g (0.80 mol) was charged to a 2 L resin kettle equipped with an overhead stirrer, Dean-Stark trap and condenser. The EPSA was stirred and heated to 160° C. under nitrogen. Tetraethylene pentamine 84 g (0.44 mol) was added drop wise via an addition funnel. The reaction mixture was stirred with heating under a vacuum for 3 h. At that time 711.6 g of process oil was added and the reaction product was filtered using in a pressure filter to afford 1572.2 g of succinimide product.

Dispersant Example 8

EPSA (ASA Example 9) 120.0 g (0.087 mol) was charged to a 500 mL 3-necked round bottom flask equipped with an overhead stirrer, Dean-Stark trap and condenser. The EPSA was stirred and heated to 160° C. under nitrogen. Tetraethylene pentamine 9.14 g (0.048 mol) was added drop wise via an addition funnel. The reaction mixture was stirred with heating under a vacuum for 3 h. At that time 93.3 g of process oil was added and the reaction product was filtered using a pressure filter to afford 196.9 g of succinimide reaction product.

Dispersant Example 9

EPSA (ASA Example 10) 120.0 g (0.094 mol) was charged to a 500 mL 3-necked round bottom flask equipped with an overhead stirrer, Dean-Stark trap and condenser. The EPSA was stirred and heated to 160° C. under nitrogen. Tetraethylene pentamine 9.87 g (0.052 mol) was added drop wise via an addition funnel. The reaction mixture was stirred with heating under a vacuum for 3 h. At that time 83.3 g of process oil was added and the reaction product was filtered using a pressure filter to afford 191.5 g of succinimide reaction product.

Dispersant Example 10

EPSA (ASA Example 11) 120.0 g (0.082 mol) was charged to a 500 mL 3-necked round bottom flask equipped with an overhead stirrer, Dean-Stark trap and condenser. The EPSA was stirred and heated to 160° C. under nitrogen. Tetraethylene pentamine 8.64 g (0.046 mol) was added drop wise via an addition funnel. The reaction mixture was stirred with heating under a vacuum for 3 h. At that time 91.9 g of process oil was added and the reaction product was filtered using a pressure filter to afford 200.7 g of succinimide reaction product.

Dispersant Example 11

EPSA (ASA Example 12) 1000 g (1.06 mol) was charged to a 2 L resin kettle equipped with an overhead stirrer, Dean-Stark trap and condenser. The EPSA was stirred and heated to 160° C. under nitrogen. Polyethylene amine 111 g (0.59 mol) was added drop wise via an addition funnel. The reaction mixture was stirred with heating under a vacuum for 3 h. At that time 767.7 g of process oil was added and the reaction product was filtered using a pressure filter to afford 1544.4 g of succinimide reaction product.

Dispersant Example 12

EPSA (ASA Example 1) 70.1 g (0.068 mol) was charged to a 250 mL round bottom 3-Neck flask equipped with an overhead stirrer, Dean-Stark trap and condenser. The ASA was stirred and heated to 160° C. under nitrogen. Tetrathylene pentamine 8.48 g (0.024 mol) was added drop wise via an addition funnel. The reaction mixture was stirred with heating under a vacuum for 3 h. At that time 19.3 g Aromatic 150 was added and filtered in a pressure filter to afford of a succinimide product.

Dispersant Example 13

An EP-copolymer substituted Mannich product was prepared from an EP copolymer-substituted hydroxyphenol, aldehyde, and dibutylamine under a Mannich reaction condition similar to that used to make a polyisobutene-substituted Mannich product. The EP copolymer-substituted hydroxylphenol was made by alkylation of a hydroxybenzene with copolymer Example 2.

Dispersant Example 14

Ethylene propylene copolymer containing 62% ethylene content was prepared under similar conditions used in preparing other inventive copolymers described above. The above copolymer (100 g, 0.11 mol) and 250 mL heptane were charged to a 1 L 3-necked round bottom flask equipped with overhead stirrer and thermocouple. To the stirred solution at room temperature under nitrogen was added 51.9 g (0.212 mol) of a hydrogen bromide acetic acid solution over 1 h period. The reaction mixture was heated at 45° C. for 2 h. 200 mL of water was added stirred and allowed to stand overnight. Aqueous work up remove aqueous layer, add 200 mL heptane to the organic layer. Wash with 24 g of a 25% w/w sodium carbonate solution. Remove aqueous layer and filter organic layer through sodium sulfate. Concentrate in vacuo to remove organic solvent afforded 100 g of the desired bromine-containing product.

The above bromine-containing product, 75 g (0.073 mol) and 35 g xylene were charged to a 500 mL 3-necked round bottom flask equipped with overhead stirrer, condenser and thermocouple. To the stirred solution at room temperature under nitrogen was added dimethylamino propylamine (72.8 g (0.7 mol) via an addition funnel. The reaction mixture was heated at 145° C. for 3 h and then cooled to 60 C. 50 mL of a 47% sodium hydroxide solution was added to the reaction mixture and stirred for 2 h. The resulting organic layer was isolated and washed three times with water in a separator funnel and dried over magnesium sulfate. Concentration in vacuo afforded 66.8 g of the desired product (Found 2.42 wt. % N, calculated 2.68 wt. %)

FORMULATION EXAMPLES

In these examples, the inventive and comparative dispersants were blended into SAE 5W-30 quality finished oils. Olefin copolymer HiTEC® 5751, commercially available from Afton Chem. Corp. (VA USA), was included as a viscosity index improver (VII). Base oils used in the examples were RHT120 commercially available from Safety Kleen Corp. (TX USA) or a mixture of Phillips 66 PP100N, 225N and Ultra-S-4 commercially available from ConocoPhillips (TX USA). Viscoplex® 1500 from Evonik Industries (Germany) or HiTEC®5714 was used as a pour point depressant at 0.2 wt %. The low temperature properties of these formulations were evaluated in the Mini Rotary Viscometer (MRV) Test at −35 (ASTM D4684). The results are shown in the table below:

TABLE 7

| Formulation Example | Base oil | PPD | VII treat rate | Disp. Example | Disp. treat rate | Disp. TBN contribution | MRV* |
| --- | --- | --- | --- | --- | --- | --- | --- |
| 1 | RHT120 | Viscoplex-1500 | 8.6 | 2 | 2.04 | 1 | 18,967 |
| 2 | RHT120 | Viscoplex-1500 | 9.6 | 3 | 5.2 | 1 | TVTM** |
| 3 | RHT120 | Viscoplex-1500 | 9.6 | 4 | 1.8 | 0.75 | 27,800 |
| 4 | Conoco-Phillips | Viscoplex-1500 | 9.0 | 6 | 2.6 | 1 | TVTM** |
| 5 | Conoco-Phillips | Viscoplex-1500 | 9.0 | 6 | 2.6 | 1 | TVTM** |
| 6 | Conoco-Phillips | Viscoplex-1500 | 9.0 | 7 | 2.6 | 1 | 30,400 |
| 7 | Conoco-Phillips | Viscoplex-1500 | 9.0 | 7 | 2.6 | 1 | 31,100 |
| 8 | Conoco-Phillips | H5714 | 9.0 | 7 | 2.6 | 1 | 26,900 |
| 9 | Conoco-Phillips | H5714 | 9.0 | 7 | 2.6 | 1 | 27,200 |
| 10 | Conoco-Phillips | H5714 | 7.0 | 8 | 4.4 | 1.35 | 70,000 |
| 11 | Conoco-Phillips | H5714 | 7.0 | 10 | 3.9 | 1.35 | 25,200 |
| 12 | Conoco-Phillips | H5714 | 7.0 | 9 | 4.5 | 1.35 | 24,900 |
| 13 | Conoco-Phillips | H5714 | 7.0 | 11 | 3.14 | 1.35 | 26,200 |

*An MRV value equal to or less than 60,000 cP is a pass of the test. Higher than 60,000 cP is a fail of the test.
**Too viscous to measure, i.e., MRV value >60,000 cP.

As shown in the above table, Dispersant Examples 2, 4, 7, and 9-11, which were prepared from copolymer having low crossover temperature and low ethylene run length, facilitated the passing of the MRV test.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Revision 07.2015, Section 2111.03.

What is claimed is:

1. A dispersant prepared by a process comprising: functionalizing a copolymer derived from ethylene and propylene,
    wherein the copolymer has a number average molecular weight of less than 4,000 g/mol as measured by GPC;
    wherein at least 30% and less than 65% of the total number of units in the copolymer are ethylene-derived units;
    wherein 70 mol % or greater of the copolymer has a carbon-carbon double bond in a terminal monomer unit, and at least 70 mol % of the terminal monomer units that have a carbon-carbon double bond have a terminal group selected from a vinylidene group and a tri-substituted isomer of a vinylidene group, wherein the vinylidene group and the tri-substituted isomer of a vinylidene group of the copolymer have one or more of the following structural formulas (A)-(B):

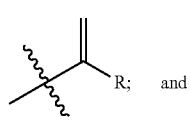

(A)

and

-continued

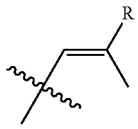

(B)

wherein R represents a methyl group and

indicates a bond attached to the remaining portion of the copolymer;

wherein the copolymer has an average ethylene-derived unit run length $n_{c2}$, as determined by $^{13}C$ NMR spectroscopy, of less than 2.6, the average ethylene-derived unit run length $n_{c2}$ is defined as the total number of ethylene-derived units in the copolymer divided by a number of runs of one or more sequential ethylene-derived units in the copolymer, and the average ethylene-derived unit run length $n_{c2}$ also satisfies the relationship shown by the expression below:

$$n_{C2} < \frac{(EEE + EEA + AEA)}{(AEA + 0.5EEA)}$$

wherein:
$EEE = (x_{C2})^3$,
$EEA = 2(x_{C2})^2(1-x_{C2})$,
$AEA = x_{C2}(1-x_{C2})^2$,
$x_{C2}$ being the mole fraction of ethylene incorporated in the copolymer as measured by $^1H$-NMR spectroscopy, E representing an ethylene unit, and A representing a propylene unit, and wherein the copolymer has a crossover temperature of −25° C. or lower.

2. The dispersant of claim 1, wherein the copolymer has a crossover temperature of −35° C. or lower.

3. The dispersant of claim 1, wherein at least 30% and less than 60% of the total number of units in the copolymer are ethylene-derived units.

4. The dispersant of claim 1, wherein at least 30% and less than 50% of the total number of units in the copolymer are ethylene-derived units.

5. The dispersant of claim 1, wherein at least 85 mol % of the unsaturation is the terminal vinylidene group and the terminal tri-substituted isomer of a vinylidene group.

6. The dispersant of claim 1, wherein at least 95 mol % of the unsaturation is the terminal vinylidene group and the terminal tri-substituted isomer of a vinylidene group.

7. The dispersant of claim 1, wherein the copolymer has an average ethylene run length of less than 2.4.

8. The dispersant of claim 1, wherein the copolymer has an average ethylene run length of less than 2.2.

9. The dispersant of claim 1, wherein the copolymer has a polydispersity index of less than or equal to 4.

10. The dispersant of claim 1, wherein the copolymer has a polydispersity index of less than or equal to 3.

11. The dispersant of claim 1, wherein the ethylene content is 40-60 mol % and the propylene content is 40-60 mol %.

12. The dispersant of claim 1, wherein the ethylene content is about 40-50 mol % and the propylene content is about 50-60 mol %.

13. The dispersant of claim 1, wherein the number average molecular weight of the copolymer is less than 2,500 g/mol, as measured by GPC.

14. The dispersant of claim 1, wherein the number average molecular weight of the copolymer is less than 1,500 g/mol, as measured by GPC.

15. The dispersant of claim 1, wherein the dispersant is post-treated.

16. The dispersant of claim 1, wherein the dispersant is posted treated with anhydride, a boron compound, or a mixture thereof.

17. The dispersant of claim 1, wherein the dispersant has one of the following formulas:

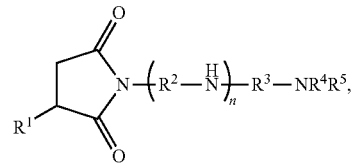

Formula (I)

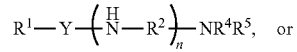

Formula (II)

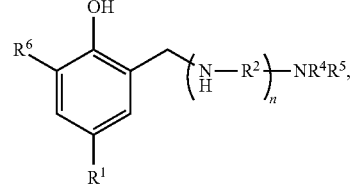

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl,

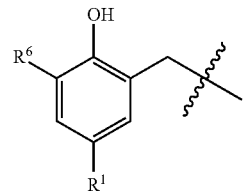

or, together with the N to which they are attached to, form a 5 or 6-membered ring optionally fused with an aromatic or non-aromatic ring; $R^6$ is H or $C_1$-$C_6$ alkyl, or —$CH_2$—$(NH—R^2)_n$—$NR^4R^5$; Y is a covalent bond or C(O); and n is 0, 1, 2, 3, 4, 5, 6, 7, or 8.

18. A lubricating oil, comprising:
at least 50 wt % of a base oil;
3-20 wt % of a viscosity index improver;
0-1 wt % of a pour point depressant; and
0.2-20 wt % of the dispersant of claim 1.

19. The lubricating oil of claim 18, wherein the lubricating oil has a mini-rotary viscometer (MRV) value of 60,000 cP or less at −30° C. as determined by the ASTM D4684 test.

20. The lubricating oil of claim 18, wherein the lubricating oil has a mini-rotary viscometer (MRV) value of 60,000 cP or less at −40° C. as determined by the ASTM D4684 test.

21. The lubricating oil of claim 18, wherein the lubricating oil contains less than 10 wt % of the dispersant.

22. A lubricating additive package comprising:
30-80 wt % of the dispersant of claim 1.

23. A fuel composition or fuel additive composition, comprising the dispersant of claim 17.

24. The fuel composition or fuel additive composition of claim 23, the dispersant having one of the following formulas:

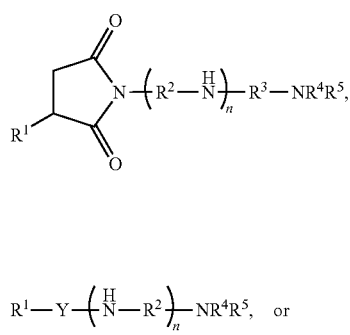

Formula (I)

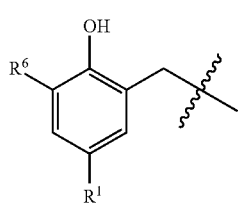

Formula (II)

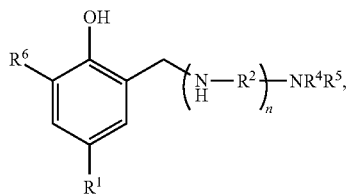

Formula (III)

wherein $R^1$ is an hydrocarbyl radical derived from the copolymer; $R^2$ is a divalent $C_1$-$C_6$ alkylene; $R^3$ is a divalent $C_1$-$C_6$ alkylene; each of $R^4$ and $R^5$, independently, is H, $C_1$-$C_6$ alkyl, or, together with the N to which they are attached to, form a 5 or 6-membered ring optionally fused with an aromatic or non-aromatic ring; $R^6$ is H or $C_1$-$C_6$ alkyl, or —$CH_2$—$(NH-R^2)_n$—$NR^4R^5$; Y is a covalent bond or C(O); and n is 0, 1, 2, 3, 4, 5, 6, 7, or 8.

* * * * *